(12) United States Patent
Li et al.

(10) Patent No.: US 11,361,467 B2
(45) Date of Patent: Jun. 14, 2022

(54) POSE SELECTION AND ANIMATION OF CHARACTERS USING VIDEO DATA AND TRAINING TECHNIQUES

(71) Applicants: Adobe Inc., San Jose, CA (US); Princeton University, Princeton, NJ (US)

(72) Inventors: Wilmot Li, Seattle, WA (US); Hijung Shin, Cambridge, MA (US); Adam Finkelstein, Princeton, NJ (US); Nora Willett, Princeton, NJ (US)

(73) Assignees: Adobe Inc., San Jose, CA (US); Princeton University, Princeton, NJ (US)

( * ) Notice: Subject to any disclaimer, the term of this patent is extended or adjusted under 35 U.S.C. 154(b) by 18 days.

(21) Appl. No.: 16/692,450

(22) Filed: Nov. 22, 2019

(65) Prior Publication Data
US 2021/0158565 A1    May 27, 2021

(51) Int. Cl.
*G06T 13/00*    (2011.01)
*G06T 7/73*    (2017.01)
(Continued)

(52) U.S. Cl.
CPC .............. *G06T 7/73* (2017.01); *G06K 9/623* (2013.01); *G06T 7/60* (2013.01); *G06T 13/40* (2013.01); *G06T 13/80* (2013.01); *G06V 20/40* (2022.01); *G06V 40/107* (2022.01); *G06T 2200/24* (2013.01); *G06T 2207/10016* (2013.01); *G06T 2207/20081* (2013.01); *G06T 2207/30196* (2013.01); *G06T 2207/30242* (2013.01)

(58) Field of Classification Search
None
See application file for complete search history.

(56) References Cited

U.S. PATENT DOCUMENTS 7,271,804 B2 *  9/2007  Evans ................... G06T 11/206
                                                                  345/440
8,648,863 B1    2/2014  Anderson et al.
(Continued)

OTHER PUBLICATIONS

Bozkurt et al., Affect-Expressive Hand Gestures Synthesis and Animation, 2015, IEEE International Conference on Multimedia and Expo (Year: 2015).*

(Continued)

*Primary Examiner* — Anh-Tuan V Nguyen
(74) *Attorney, Agent, or Firm* — Kilpatrick Townsend & Stockton LLP

(57) ABSTRACT

This disclosure generally relates to character animation. More specifically, this disclosure relates to pose selection using data analytics techniques applied to training data, and generating 2D animations of illustrated characters using performance data and the selected poses. An example process or system includes extracting sets of joint positions from a training video including the subject, grouping the plurality of frames into frame groups using the sets of joint positions for each frame, identifying a representative frame for each frame group using the frame groups, clustering the frame groups into clusters using the representative frames, outputting a visualization of the clusters at a user interface, and receiving a selection of a cluster for animation of the subject.

20 Claims, 11 Drawing Sheets

(51) Int. Cl.
| | |
|---|---|
| G06T 13/80 | (2011.01) |
| G06T 7/60 | (2017.01) |
| G06K 9/62 | (2022.01) |
| G06T 13/40 | (2011.01) |
| G06V 20/40 | (2022.01) |
| G06V 40/10 | (2022.01) |

(56) References Cited

U.S. PATENT DOCUMENTS

| | | | |
|---|---|---|---|
| 9,058,663 B2* | 6/2015 | Andriluka | G06K 9/00342 |
| 9,600,717 B1 | 3/2017 | Dai et al. | |
| 10,460,512 B2* | 10/2019 | Chen | G06T 15/04 |
| 2003/0034980 A1* | 2/2003 | Imagawa | G06T 19/20 |
| | | | 345/474 |
| 2005/0225566 A1* | 10/2005 | Kojo | G06T 11/00 |
| | | | 345/629 |
| 2009/0142029 A1 | 6/2009 | Lin et al. | |
| 2010/0156787 A1* | 6/2010 | Katayama | G06F 3/0304 |
| | | | 345/157 |
| 2010/0207949 A1* | 8/2010 | Spencer | G06T 13/40 |
| | | | 345/473 |
| 2011/0025834 A1 | 2/2011 | Chen et al. | |
| 2011/0128292 A1 | 6/2011 | Ghyme et al. | |
| 2011/0142335 A1* | 6/2011 | Ghanem | G06K 9/6215 |
| | | | 382/165 |
| 2011/0292055 A1* | 12/2011 | Hodgins | G06T 13/40 |
| | | | 345/473 |
| 2012/0038664 A1* | 2/2012 | Sheasby | G06T 11/60 |
| | | | 345/629 |
| 2012/0089949 A1 | 4/2012 | Chen et al. | |
| 2013/0278501 A1* | 10/2013 | Bulzacki | G06F 3/0304 |
| | | | 345/157 |
| 2014/0037269 A1 | 2/2014 | Kumar et al. | |
| 2014/0176784 A1* | 6/2014 | Hongu | H04N 5/23212 |
| | | | 348/349 |
| 2015/0187114 A1* | 7/2015 | Kim | G06T 13/40 |
| | | | 345/419 |
| 2016/0110595 A1* | 4/2016 | Wang | G06K 9/6201 |
| | | | 705/27.2 |
| 2016/0335487 A1 | 11/2016 | Ming et al. | |
| 2017/0266491 A1* | 9/2017 | Rissanen | G09B 19/003 |
| 2018/0268589 A1* | 9/2018 | Grant | G06T 13/40 |
| 2018/0322680 A1* | 11/2018 | McElmurray | G06K 9/00255 |
| 2019/0128677 A1 | 5/2019 | Naman | |
| 2019/0266734 A1* | 8/2019 | Yamanaka | G06T 7/50 |
| 2020/0005544 A1 | 1/2020 | Kim | |
| 2020/0126284 A1 | 4/2020 | Garofalo et al. | |

OTHER PUBLICATIONS

Adobe Character Animator Puppets, GraphicMama, Available Online at: https://graphicmama.com/blog/adobe-character-animator-puppets/, 2016, updated Apr. 29, 2020, accessed Oct. 5, 2020, 17 pages.

Adobe, Character Animator, Adobe, https://helpx.adobe.com/adobe-character-animator/using/whats-new/2019.html, 2019, 7 pages.

Donald Trump—Caricature, DonkeyHotey, Available Online at: https://www.flickr.com/photos/donkeyhotey/34230950904/, 2017, 2 pages.

Merriam-Webster Online Dictionary, Merriam-Webster Incorporated, Available Online at: http://www.merriam-webster.com, 2020, 10 pages.

Yopuppet, Available Online at: http://yopuppet.com/, 2020, 1 page.

U.S. Appl. No. 16/692,471 , First Action Interview Pilot Program Pre-Interview Communication, dated May 21, 2021, 5 pages.

Bellman et al., Dynamic Programming, Courier Corporation, 2013, 366 pages.

Bozkurt et al., Affect-Expressive Hand Gestures Synthesis and Animation, Institute of Electrical and Electronics Engineers International Conference on Multimedia and Expo, 2015, pp. 1-6.

Bratt, Rotoscoping: Techniques and Tools for the Aspiring Artist, Focal Press, 2012, 287 pages.

Bulat et al., Human Pose Estimation Via Convolutional Part Heatmap Regression, European Conference on Computer Vision, 2016, 16 pages.

Cassell et al., BEAT: The Behavior Expression Animation Toolkit, Proceedings of the 28th Annual Conference on Computer Graphics and Interactive Techniques, Jan. 2001, pp. 477-486.

Fan et al., ToonCap: A Layered Deformable Model for Capturing Poses from Cartoon Characters, Proceedings of the Joint Symposium on Computational Aesthetics and Sketch-Based Interfaces and Modeling and Non-Photorealistic Animation and Rendering, Aug. 2018, 12 pages.

Fang et al., RMPE: Regional Multi-Person Pose Estimation, 2017 Institute of Electrical and Electronics Engineers International Conference on Computer Vision, Oct. 22-29, 2017, pp. 2353-2362.

Fernandez-Baena et al., Gesture Synthesis Adapted to Speech Emphasis, Speech Communication, vol. 57, Feb. 2014, 3 Pages.

Frey et al., Clustering by Passing Messages Between Data Points, Science, vol. 315, Feb. 16, 2007, pp. 972-976.

Gallina et al., Cartoon Donald Trump Delights Audiences on The Late Show with Stephen Colbert, Adobe Creative Cloud, Available Online at https://blog.adobe.com/en/publish/2016/09/26/cartoon-donald-trump-late-show-with-stephen-colbert.html#gs.grehv1, Sep. 2016, 5 pages.

Guest et al., Labanotation: The System of Analyzing and Recording Movement, Performing Arts, Fourth Edition, 2013, 3 pages.

Hidalgo et al., OpenPose: Real-Time Multi-Person Keypoint Detection Library for Body, Face, Doubt and Hands Estimation, Merriam-Webster, Incorporated, Available Online at: https://pythonrepo.com/repo/CMU-Perceptual-Computing-Lab-openpose-python-deep-learning , 2018, updated Jul. 3, 2021, pp. 1-24.

Jorg et al., Data-Driven Finger Motion Synthesis for Gesturing Characters, Association for Computing Machinery Transactions on Graphics, vol. 31, No. 6, Nov. 2012, 7 pages.

Levine et al., Gesture Controllers, Association for Computing Machinery Transactions on Graphics, vol. 29, No. 4, Jul. 2010, 11 pages.

Levine et al., Real-Time Prosody-Driven Synthesis of Body Language, Association for Computing Machinery Transactions on Graphics, vol. 28, Dec. 2009, 9 pages.

Marsella et al., Virtual Character Performance from Speech, Association for Computing Machinery SIGGRAPH / Eurographics Symposium on Computer Animation, Jul. 2013, pp. 25-35.

McNeill, Hand and Mind: What Gestures Reveal About Thought, University of Chicago Press, 1992.15 pages.

Miller, Trump Statue Liberty, Available Online at https://www.flickr.com/photos/rupertomiller/34434120703/, 2017, 3 pages.

Moeslund et al., A Survey of Advances in Vision-Based Human Motion Capture and Analysis, Computer Vision and Image Understanding, vol. 104, Issues 2-3, 2006, pp. 90-126.

Molchanov et al., Hand Gesture Recognition with 3d Convolutional Neural Networks, Institute of Electrical and Electronics Engineers Conference on Computer Vision and Pattern Recognition Workshops, 2015, pp. 1-7.

Neff et al., Gesture Modeling and Animation Based on a Probabilistic Re-Creation of Speaker Style, Association for Computing Machinery Transactions on Graphics, Mar. 2008, 24 pages.

Newell et al., Stacked Hourglass Networks for Human Pose Estimation, European Conference on Computer Vision, Jul. 26, 2016, pp. 483-499.

Perez-Ortiz et al., A Practical Guide and Software for Analysing Pairwise Comparison Experiments, University of Cambridge, 2017, 20 pages.

Ramakrishnan et al., Segmentation of Hand Gestures using Motion Capture Data, Proceedings of the 2013 International Conference on Autonomous Agents and Multi-Agent Systems, May 2013, pp. 1249-1250.

Rutgers et al., Speaking with Hands: Creating Animated Conversational Characters from Recordings of Human Performance, Association for Computing Machinery Transactions on Graphics, Aug. 2004, pp. 506-513.

(56) References Cited

OTHER PUBLICATIONS

Simon et al., Hand Keypoint Detection in Single Images Using Multiview Bootstrapping, Institute of Electrical and Electronics Engineers Conference on Computer Vision and Pattern Recognition, 2017, pp. 1145-1153.
Song et al., Design and Evaluation of a Sketch-Based Gesture Animation Tool, Proceedings of the Seventh International Conference on Motion in Games, Nov. 2014, 1 page.
Thurstone, The Method of Paired Comparisons for Social Values, The Journal of Abnormal and Social Psychology, vol. 21, No. 4, 1927, pp. 384-400.
Wei et al., Convolutional Pose Machines, Proceedings of the Institute of Electrical and Electronics Engineers Conference on Computer Vision and Pattern Recognition, 2016, pp. 4724-4732.
Willett et al., Secondary Motion for Performed 2D Animation, Proceedings of the 30th Annual Association for Computing Machinery Symposium on User Interface Software and Technology, Oct. 2017, pp. 97-108.
Willett et al., Triggering Artwork Swaps for Live Animation, Proceedings of the 30th Annual Association for Computing Machinery Symposium on User Interface Software and Technology, Oct. 22-25, 2017, pp. 85-95.
Williams et al., Trump as Offense Secretary, Available Online at: https://www.flickr.com/photos/45909111@N00/20659781759/, 2015.
Assa et al., Action Synopsis: Pose Selection and Illustration, Association for Computing Machinery Transactions on Graphics, vol. 24, No. 3, Jul. 2005, pp. 667-676.
Furukawa et al., Voice Animator: Automatic Lip-Synching in Limited Animation by Audio, International Conference on Advances in Computer Entertainment, Feb. 2018, pp. 153-171.
Hornung et al., Character Animation from 2D Pictures and 3D Motion Data, Association for Computing Machinery Transactions on Graphics, vol. 26, Issue 1, Jan. 2007, pp. 1-9.
Kazi et al., Draco: Bringing Life to Illustrations with Kinetic Textures, Proceedings of the Special Interest Group on Computer-Human Interaction Conference on Human Factors in Computing Systems, Available Online at: http://dx.doi.org/10.1145/2556288.2556987, 2014, pp. 351-360.
Kazi et al., Sketching Stylized Animated Drawings with Motion Amplifiers, Proceedings of the 2016 CHI Conference Extended Abstracts on Human Factors in Computing Systems, May 2016, 1 page.
Kingma et al., Adam: A Method for Stochastic Optimization, The International Conference on Learning Representations, Available Online at: https://arxiv.org/pdf/1412.6980.pdf, 2015, pp. 1-15.
Maaten et al., Visualizing Data Using t-SNE, Journal of Machine Learning Research, vol. 9, Nov. 2008, pp. 2579-2605.
Mikolov et al., Efficient Estimation of Word Representations in Vector Space, Available Online at: https://arxiv.org/pdf/1301.3781.pdf, 2013, pp. 1-12.
Muda et al., Voice Recognition Algorithms Using Mel Frequency Cepstral Coefficient (MFCC) and Dynamic Time Warping (DTW) Techniques, Journal of Computing, vol. 2, Issue 3, Mar. 2010, pp. 138-143.
Pan et al., Sketch-Based Skeleton-Driven 2d Animation and Motion Capture, In Transactions on Edutainment VI, 2011, pp. 164-181.
Schaefer et al., Image Deformation Using Moving Least Squares, Association for Computing Machinery Transactions on Graphics vol. 25, No. 3, 2006, 8 pages.
Sjolander, An HMM-Based System for Automatic Segmentation and Alignment of Speech, Umea University, Department of Philosophy and Linguistics, 2003, pp. 93-96.
Su et al., Live Sketch: Video-Driven Dynamic Deformation of Static Drawings, In Proceedings of the 2018 CHI Conference on Human Factors in Computing Systems, 2018, 12 pages.
Subramonyam et al., TakeToons: Script-Driven Performance Animation, Proceedings of the 31st Annual ACM Symposium on User Interface Software and Technology, Oct. 2018, pp. 663-674.
Wang et al., An RNN-Based Quantized F0 Model with Multi-Tier Feedback Links for Text-to-Speech Synthesis, Interspeech, Available Online at: https://www.isca-speech.org/archive/Interspeech_2017/pdfs/0246.PDF, 2017, pp. 1059-1063.
Yu et al., Customized Expression Recognition for Performance-Driven Cutout Character Animation, 2016 Institute of Electrical and Electronics Engineers Winter Conference on Applications of Computer Vision, 2016, pp. 1-9.
Barnes et al., Video Puppetry: A Performative Interface for Cutout Animation, Association for Computing Machinery Transactions on Graphics, vol. 27, No. 5, Dec. 2008, 9 pages.
U.S. Appl. No. 16/692,471, First Action Interview Office Action Summary, dated Aug. 9, 2021, 5 pages.
U.S. Appl. No. 16/692,471, Notice of Allowance, dated Oct. 29, 2021, 7 pages.

* cited by examiner

800

```
┌─────────────────────────────────────────────────────────────────────┐
│ OUTPUTTING A VISUALIZATION OF TRAINING POSES AT A USER INTERFACE,   │
│ THE TRAINING POSES REPRESENT CLUSTERS OF TRAINING FRAMES FROM A     │
│ TRAINING VIDEO, THE TRAINING FRAMES EACH INCLUDING A POSE OF THE    │
│ SUBJECT FROM THE TRAINING VIDEO                                     │
│                              802                                    │
└─────────────────────────────────────────────────────────────────────┘
                                  ▼
┌─────────────────────────────────────────────────────────────────────┐
│              RECEIVING A SELECTION OF TRAINING POSES                │
│                              804                                    │
└─────────────────────────────────────────────────────────────────────┘
                                  ▼
┌─────────────────────────────────────────────────────────────────────┐
│ ASSOCIATING EACH TRAINING POSE FROM THE SELECTION OF TRAINING POSES │
│ WITH A CHARACTER POSE                                               │
│                              806                                    │
└─────────────────────────────────────────────────────────────────────┘
                                  ▼
┌─────────────────────────────────────────────────────────────────────┐
│ OBTAINING A PERFORMANCE VIDEO OF THE SUBJECT, THE PERFORMANCE VIDEO │
│ INCLUDING A PLURALITY OF PERFORMANCE FRAMES THAT INCLUDE POSES      │
│ PERFORMED BY THE SUBJECT                                            │
│                              808                                    │
└─────────────────────────────────────────────────────────────────────┘
                                  ▼
┌─────────────────────────────────────────────────────────────────────┐
│ GROUPING THE PLURALITY OF PERFORMANCE FRAMES INTO GROUPS OF         │
│ PERFORMANCE FRAMES                                                  │
│                              810                                    │
└─────────────────────────────────────────────────────────────────────┘
                                  ▼
┌─────────────────────────────────────────────────────────────────────┐
│ ASSIGNING A SELECTED TRAINING POSE FROM THE SELECTION OF TRAINING   │
│ POSES TO EACH GROUP OF PERFORMANCE FRAMES USING THE CLUSTERS OF     │
│ TRAINING FRAMES                                                     │
│                              812                                    │
└─────────────────────────────────────────────────────────────────────┘
                                  ▼
┌─────────────────────────────────────────────────────────────────────┐
│ GENERATING A SEQUENCE OF CHARACTER POSES BASED ON THE GROUPS OF     │
│ PERFORMANCE FRAMES AND THEIR ASSIGNED TRAINING POSES                │
│                              814                                    │
└─────────────────────────────────────────────────────────────────────┘
                                  ▼
┌─────────────────────────────────────────────────────────────────────┐
│              OUTPUTTING THE SEQUENCE OF CHARACTER POSES             │
│                              816                                    │
└─────────────────────────────────────────────────────────────────────┘
```

FIG. 8

POSE SELECTION AND ANIMATION OF CHARACTERS USING VIDEO DATA AND TRAINING TECHNIQUES

TECHNICAL FIELD

This disclosure generally relates to character animation. More specifically, but not by way of limitation, this disclosure relates to pose selection using data analytics techniques applied to training data, and generating 2D animations of illustrated characters using performance data and the selected poses.

BACKGROUND

Animation is a method where pictures (e.g., photographs, drawings, etc.) are manipulated to appear as moving images. Commonly, animation includes rapid succession of sequential images. Each image in the succession of sequential images may differ from the image directly before it and the image directly after it only minimally. Animation is used for a variety of purposes, such as films, video games, special effects, GIFs, among others. Artists who specialize in animation may be called animators.

In some situations, 3D or 2D animation are used to mimic a specific human performance. Performance animation provides a convenient way to show how characters move in the performance. In one method, an artist or animator authors individual frames, and then link the various frames together to create an animation. For 3D animation, each joint on a subject corresponds to a matching joint on an animated character, which allows for straight-forward and direct matching of continuous motion, and resulting convincing animations.

SUMMARY

This disclosure generally relates to character animation. More specifically, but not by way of limitation, this disclosure relates to pose selection using data analytics techniques applied to training data, and generating 2D animations of illustrated characters using performance data and the selected poses. For example, a pose selection system according to embodiments of the present technology includes extracting, by a processing device, sets of joint positions from a training video including the subject. Each set of joint positions is associated with a different frame of a plurality of frames from the training video. The pose selection system also includes grouping, by the processing device, the plurality of frames into frame groups using the sets of joint positions for each frame. A frame group includes a set of consecutive frames of the plurality of frames. The frame group represents a pose of the subject. The pose selection system also includes identifying, by the processing device, a representative frame for each frame group using the frame groups. The pose selection system also includes clustering, by the processing device, the frame groups into clusters using the representative frames. Each cluster includes frame groups that include different representations of the pose of the subject. The pose selection system also includes outputting a visualization of the clusters at a user interface. The pose selection system also includes receiving a selection of a cluster for animation of the subject.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 8 depicts a flow chart of an example process for facilitating pose selection and animation generation, according to embodiments of the present technology

DETAILED DESCRIPTION

Figure 1:
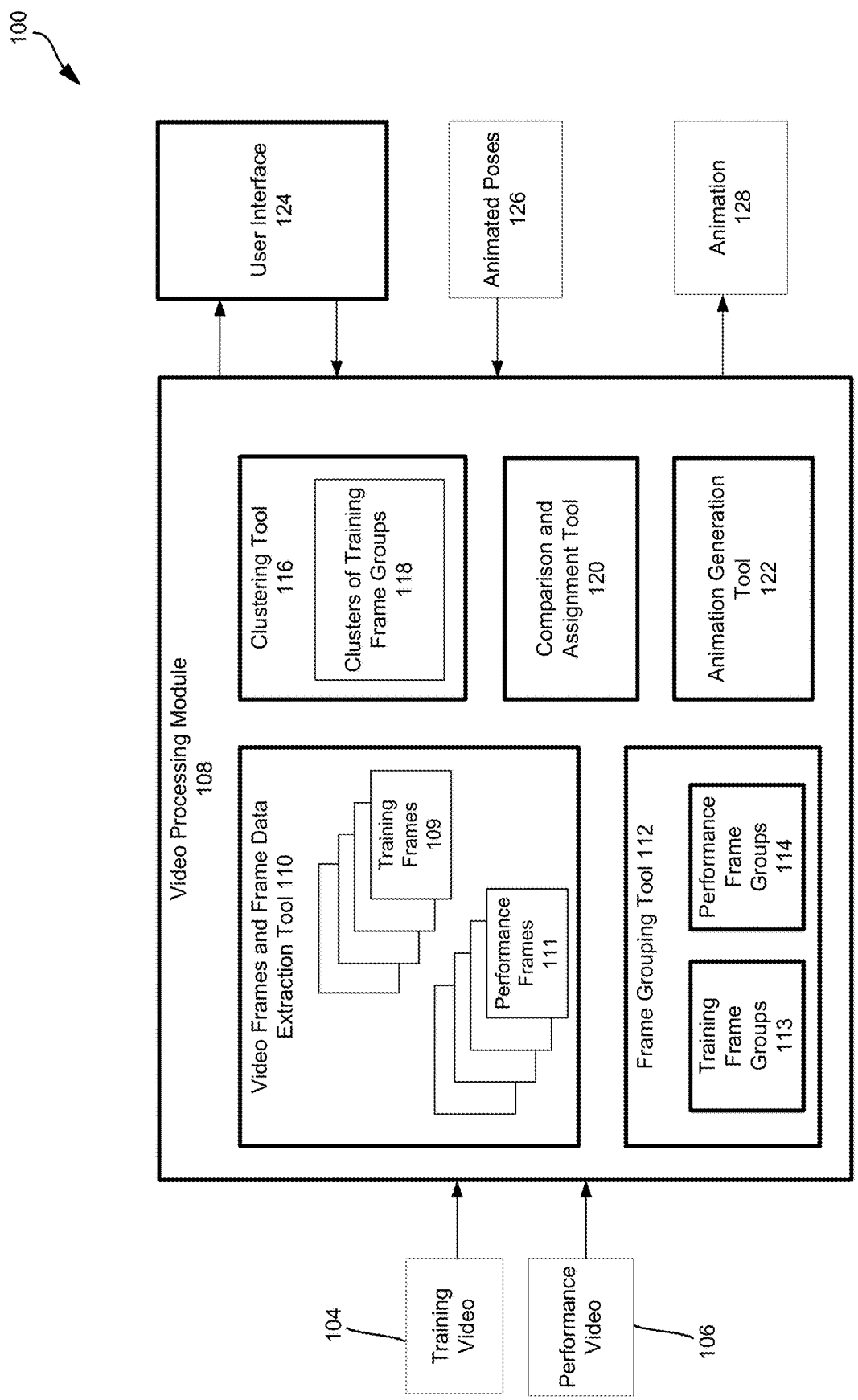
FIG. 1 depicts a block diagram representing a pose selection and animation generation system, according to example embodiments of the present technology.

The present disclosure includes systems and methods for pose selection using data analytics techniques applied to training data, and generating 2D animations of illustrated characters using performance data and the selected poses. Example embodiments described herein provide an automated system and method for using training data, including a training video, to generate clusters of frame groups from the training video that each represent a pose of the subject, and to present representative frames from those clusters to a user to select appropriate poses for animation. Embodiments described herein also provide an automated system and method for animating a specific performance of the subject using the selected poses and pose drawings inputted by the user by automatically assigning the pose drawings to groups of frames from video of the specific performance, and generating an animation from the pose drawings. These new approaches to 2D performance animation described by example embodiments of the present technology facilitate design and animation of 2D characters from reference videos, including training and performance videos. Example embodiments of the present technology include a pose selection and animation generation system, which includes a pose selection system and a separate animation generation system.

The following non-limiting example is provided to introduce certain embodiments. In this example, a pose selection and animation generation system includes one or more computing systems that execute a pose selection system and an animation generation system. A pose selection system obtains a training video, which includes a subject demonstrating typical movements and physical or personality traits of the subject. The pose selection system analyzes the training video to extract frames from the training video and a set of joint positions for each frame. The pose selection system uses the joint positions for each frame to determine a hand type (or other characteristic) of the subject in each frame. For example, a frame is designated as a left hand frame, a right hand frame, or a both left and right hand frame based on which hands (e.g., certain joints of the hands) of the subject are visible and detectable in the frame. The pose selection system groups the frames into frame groups. A frame group includes consecutive frames from the training video that represent a pose of the subject. The pose selection system clusters groups of frames into clusters. The clusters include frame groups that represent similar poses of the subject. The pose selection system outputs a visualization of clusters to a user interface so that a user (e.g., an artist) selects training poses (i.e., clusters) to be used for animation of the subject. As such, the pose selection system analyzes the subject's poses in the training video to automatically provide a pose selection interface to help a user browse and select a set of representative poses to draw to prepare for animation.

In some embodiments, after selecting poses from the selection interface, a user, such as an artist, creates renderings (e.g., drawings or other artistic versions) of a character, which represents the subject in the training video. An animation generation system obtains the renderings and a performance video, and uses the renderings to generate an animation of the performance video.

As used herein, the term "subject" is used to refer to a person or an electronic or virtual reproduction of a person in an image or a video, such as, for example, a training video or a performance video or a still frame from such a video. A subject may be an actor in a video, or may be a person in an already existing video.

As used herein, the term "character" is used to refer to a rendering (e.g., drawing or other artistic version) of a person or other animal, such as, for example, a rendering created by an artist using the pose selection and animation generation system to an animate a subject from a training or performance video.

Embodiments of the present technology provide improvements over existing software tools for generating a pose selection interface and generating an animation using a user's selected poses. For example, existing processes require users (e.g., artists, designers) to manually generate a set of renderings, such as a collection of drawn artwork, that depict portions of a character in a suitable set of poses that can be selected and combined to express a range of gestures typical for the subject that corresponds to the character. It may not be practical for an artist to draw every possible pose for a 2D character. Therefore, an artist must manually and carefully choose a good representative subset of poses to render, and requires subjective decision-making that may not result in a set of poses that accurately reflect the subject. Furthermore, to animate a specific performance of the subject, existing processes require that the user manually select a subset of the renderings from the generated set of renderings and manually position the selected renderings in a specific and appropriate order that corresponds to the performance. This practice may not be practical if a video includes a large number of frames. Manually selecting and organizing renderings based on a performance decreases the utility of animation since the process can be inefficient and inexact. Furthermore, a user's selections are subjective, and the user's subjective judgments may cause the animation to not accurately reflect the subject's performance being animated. For example, existing tools rely on a user's manual effort and subjective judgments to select or generate a set renderings that accurately reflect the range of poses of a subject, and the user may leave certain poses out of the set. In another example, existing tools rely on a user's manual effort and subject judgments to select a subset of renderings that accurately reflect the range of poses of a subject in a specific performance, and the user may leave certain poses out of the subset or organize the renderings incorrectly. Embodiments described herein can facilitate an automated process for generating a display of poses for a user to choose from that avoids this reliance on subjective, manual determinations by the user. Embodiments described herein can facilitate an automated process for generating an animation based on user pose selections that also avoids this reliance on subjective, manual determinations by the user. In these automated processes, visualizations of poses are organized on an interface in accordance with particular rules applied by the computing device in a manner that reduces or eliminates the need for subjective judgments and/or manual efforts involved in prior techniques. For example, a pose selection system described herein uses various rules to identify a unique set of poses that represent a specific subject that a user wants to animate, and provides data associated with the poses that allows a user to select poses most relevant to the performance and the subject. For example, some rules can be associated with poses previously performed by the subject, the frequency of poses performed by the subject, among others. A process that applies these rules can rapidly output a suggested set of poses for animation, which can then be fine-tuned if desired. The particular rules used to automate this process can improve the operation of software tools used to propose poses for selection, and then generate an animation, e.g., by reducing the manual effort associated with techniques performed with existing tools, providing improved aesthetic quality as compared to the subjective efforts involved in techniques performed with existing tools, or both.

Referring now to the drawings, FIG. 1 depicts a block diagram representing a pose selection and animation generation system 100, according to example embodiments of the present technology. In some embodiments, pose selection and animation generation system 100 includes a video processing module 108 and a user interface 124. Video processing module 108 is used to process data, such as videos, to generate animations according to embodiments of the present technology. Examples of devices that include a video processing module 108 include, but are not limited to, a personal computer, a tablet computer, a desktop computer, a processing unit, servers, cloud infrastructure, any combination of these devices, or any other suitable device having one or more processors. For example, the program code for the video processing module 108, which is stored in a non-transitory computer-readable medium, is executed by one or more processing devices. In some embodiments, video processing module 108 includes a variety of tools, or software applications, that each perform a portion of the systems and methods described herein to facilitate pose selection and animation generation. For example, video processing module 108 includes a video frames and frame data extraction tool 110, a frame grouping tool 112, a clustering tool 116, a comparison and assignment tool 120, and an animation generation tool 122.

Video processing module 108 receives, or obtain, a video, such as training video 104 and/or performance video 106. Executing the video processing module 108 causes the processing device to access the training video 104 and/or the performance video 106 from the same non-transitory computer-readable medium or a different non-transitory computer-readable medium. In some embodiments, accessing the a video or associated video data involves communicating, via a data bus, suitable signals between a local non-transitory computer-readable medium and the processing device. In additional or alternative embodiments, accessing the video or associated video data involves communicating, via a data network, suitable signals between a computing system that includes the non-transitory computer-readable medium and a computing system that includes the processing device. Video processing module 108 receives or obtain training video 104 and/or performance video 106 via a variety of methods or networks. Similarly, video processing module 108 communicates with, receive data from, and send data to, user interface 124 via a variety of different methods or networks. After a video, such as training video 104 or performance video 106, has been obtained, the various tools within video processing module 108 are performed on the video to ultimately generate an animation, according to embodiments of the present technology.

Pose selection and animation generation system 100 is configured to generate animations of subjects using renderings of character poses generated by a user, such as an artist. Pose selection and animation generation system 100 includes two different subsystems, including a pose selection system and an animation generation system. In some embodiments, video processing module 108 is used as part of both the pose selection system and the animation generation system. In some embodiments, video processing module 108 receives or obtain a training video 104, which includes a human subject performing poses. Training video 104 is then used to determine which poses the subject performs to facilitate generating an animation of that subject. In alternative embodiments, training video 104 is used to determine which poses a first subject performs to facilitate generating an animation 128 of a different subject (e.g., a different subject acting as the first subject).

Video frames and frame data extraction tool 110 is configured to process training video 104 to extract training video frames 109 and data associated with those frames from training video 104, and configured to process performance video 106 to extract performance video frames 111 and data associated with those frames from performance video 106. Frame grouping tool 112 is configured to group frames from each video into frame groups. For example, frame grouping tool 112 is configured to group frames from training video 104 into training frame groups 113, and frame grouping tool 112 is configured to group frames from performance video 106 into training frame groups 114. In some embodiments, the different frames within a frame group share certain characteristics. For example, frames within a frame group are consecutive frames from a video, depict the subject performing the same or a similar pose, depict the subject's joints or other physical characteristics located in similar places, each include the same number of visible hands of the subject, among others. Clustering tool 116 is configured to cluster multiple frame groups, such as training frame groups 113, into clusters of frame groups, such as clusters of training frame groups 118. Clusters of frame groups include frame groups that depict, for example, the same or similar poses performed by the subject in the training video 104. A visualization of clusters of training frame groups 118 are outputted at a user interface, such as user interface 124. A user, such as an artist, selects clusters (i.e., poses) at the user interface 124 for use in generating an animation 128 of the subject. For example, the user generates animated poses 126, such as animated poses of a character that resembles the subject from the training video 104. Animated poses 126 are an input back into video processing module 108 for use in generating an animation, such as an animation 128. Comparison and assignment tool 120 is configured to compare performance frame groups 114 with the clusters of training frame groups 118 selected by the user, and assign an animated pose 126 to each performance frame group 114 based on the clusters of training frame groups selected by the user. Animation generation tool 122 is configured to use the assignment of animated poses 126 to performance frame groups 114 to generate a sequence of animated poses, or an animation. The sequence of animated poses may also be processed using various mechanisms to improve the quality of the animation, such as adding continuous movement to the sequence of animated poses. The tools discussed herein will be discussed further with respect to systems and methods described with respect to the other figures described herein.

In some embodiments of the present technology, a training video is processed without grouping the frames of the training video before clustering. For example, the clustering is performed on ungrouped frames from the training video. Such a process of clustering ungrouped frames may take a longer amount of time than clustering grouped frames.

Figure 2:
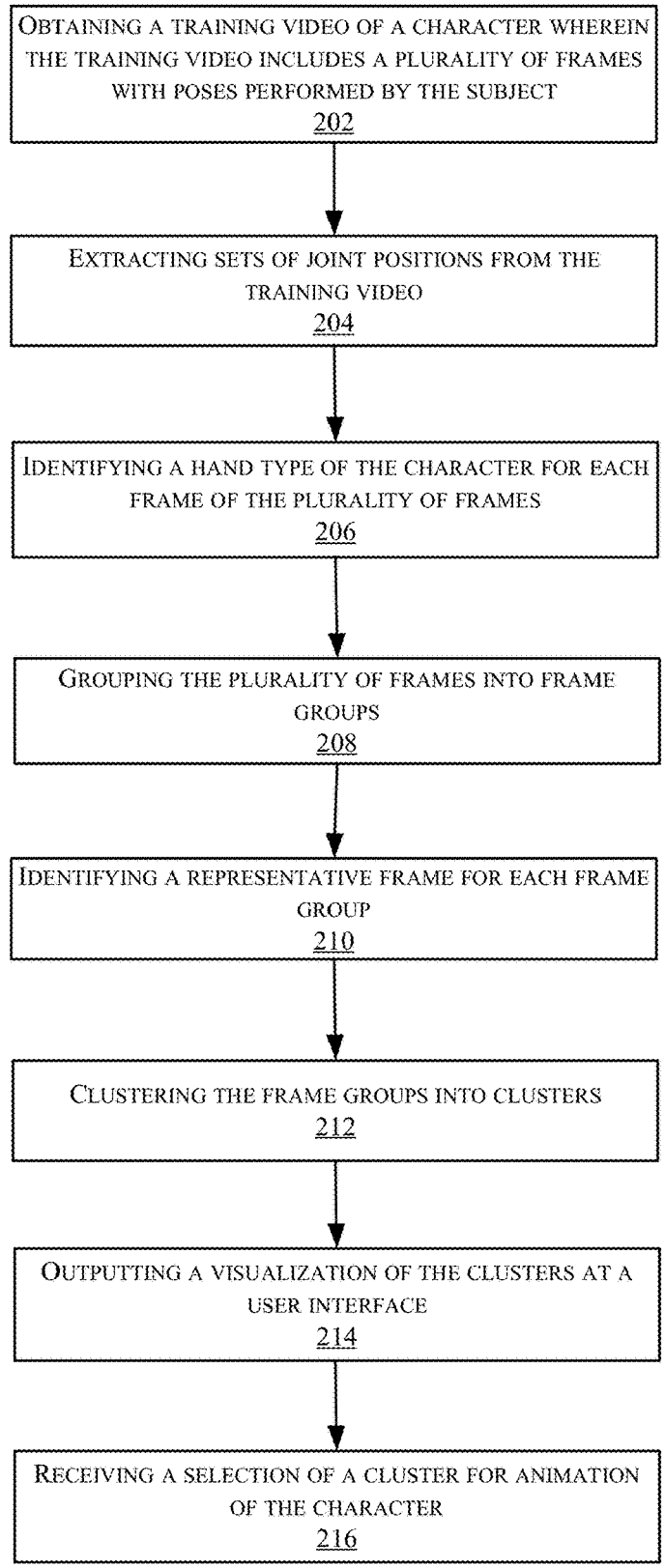
FIG. 2 depicts a flow chart of an example process for facilitating pose selection and animation generation, according to embodiments of the present technology.

FIG. 2 depicts a flow chart of an example process 200 for facilitating pose selection and animation generation, according to embodiments of the present technology. Step 202 of process 200 includes obtaining a training video of the character. In some embodiments, the training video is the same or similar to, for example, training video 104 in FIG. 1. The training video includes a subject 330 that demonstrates the personality and typical movements of the subject 330. The training video is used to generate representative poses of subject 330 of the training video so that an animation is generated of a character that represents the subject 330. The training video helps the pose selection system to provide representative poses to a user (e.g., an artist), who can use representative poses to generate renderings of a character that represents the subject 330, which are used for the animation.

Figure 3:
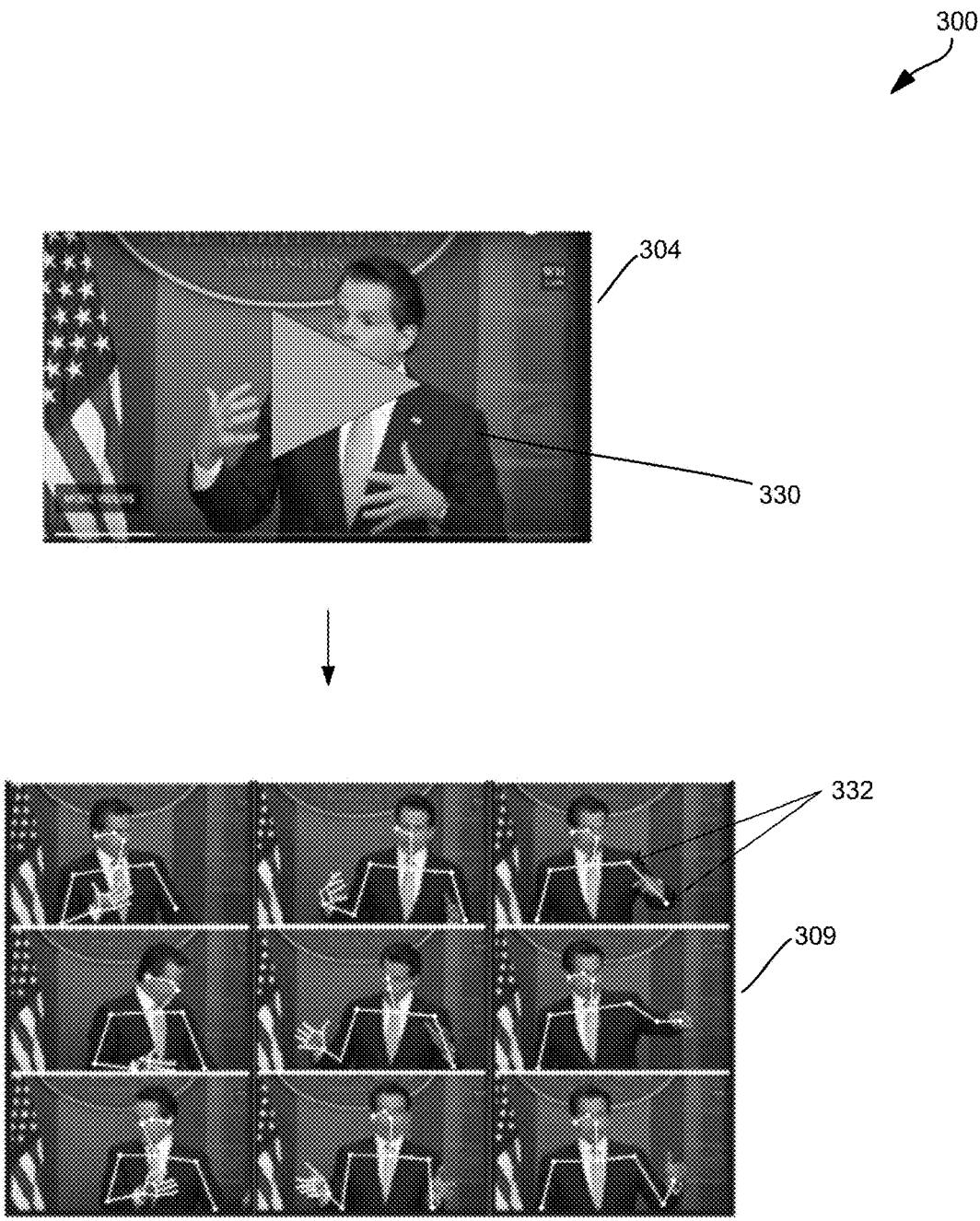
FIG. 3 depicts a diagram that includes a training video and a set of training frames extracted from the training video, according to embodiments of the present technology.

FIG. 3 depicts a diagram 300 that includes a training video 304 and a set of training frames 309 extracted from the training video 304, according to embodiments of the present technology. Training video 304 in FIG. 3 is an example of a training video that may be used as an input to the pose selection system. The training video includes a plurality of training frames 309 with poses performed by the character. The example set of frames 309 extracted from training video 304 includes a variety of poses. Each frame from set of training frames 309 includes a different pose (or, for example, a similar but slightly different pose) from the subject 330 of training video 304 since each frame includes a different snapshot of the training video 304 from a different moment in time from the training video 304. In other words, the subject 330 performs a variety of different poses throughout the training video 304, and since the training frames 309 of the video 304 each capture a different temporal portion of the training video 304, the different training frames 309 each capture a different pose, or a same pose with slightly different body position. Frames with similar poses are grouped together, as discussed further herein (e.g., with respect to step 208).

One or more of steps 202-216 of process 200 may be excluded from the process such that the method 200 may include fewer than all of operations 202-216. For example, operation 202 (obtaining a training video of a character wherein the training video includes a plurality of frames with poses performed by the subject) may be excluded from some embodiments, or replaced by another step.

Referring back to FIG. 2, step 204 includes extracting sets of joint positions from the training video. In some embodiments, the pose selection system extracts training frames 309 from training video 304, and extracts other data from training video 304. For example, the pose selection system analyzes training video 304 or training frames 309 to identify the subject 330 in each frame, and determine joint positions 332 associated with the subject's body parts, such as the subject's head, hands, and arms. In some embodiments, each set of joint positions 332 is associated with a different frame of the training video. Since each frame represents a different snapshot from a different temporal portion of the training video 304, each frame includes different joint positions 332. Other related data may be extracted from the training video 304 or the set of training frames 309, such as coordinates for each joint position (e.g., in (x, y) format), confidence scores for each joint or body part position, among others. The pose selection system generates a feature vector for each frame. The feature vector for a particular frame includes data associated with that frame, such as including the extracted joint positions, confidence stores, or other data associated with the training video or frame. In some embodiments, the joint positions and/or other data are applied to visual representations of the extracted frames, such as shown with joint positions 332 on training frames 309 in FIG. 3. The visual representations of the training frames and their respective joint positions are outputted to a user interface for a user to view and select, as discussed further herein. One example of a software application that is used to extract frames and other data from a video, such as training video 304, is open source library OpenPose. In some embodiments, OpenPose generates the feature vector associated with each frame, or other portions of the pose selection system may generate the feature vectors.

In some embodiments, the joint position data included in a feature vector for a frame includes a variety of different data points. In some embodiments, the joint positions include coordinate values of each wrist joint in the frame relative to the neck joint in the frame. In some embodiments, the joint positions include distances from each fingertip to that finger's corresponding wrist joint. Data associated with gross arm movements (e.g., wrist positions) and more fine-grained movements (e.g., hand shape, including finger joint positions) are captured and included in the feature vector associated with a frame.

Figure 4:
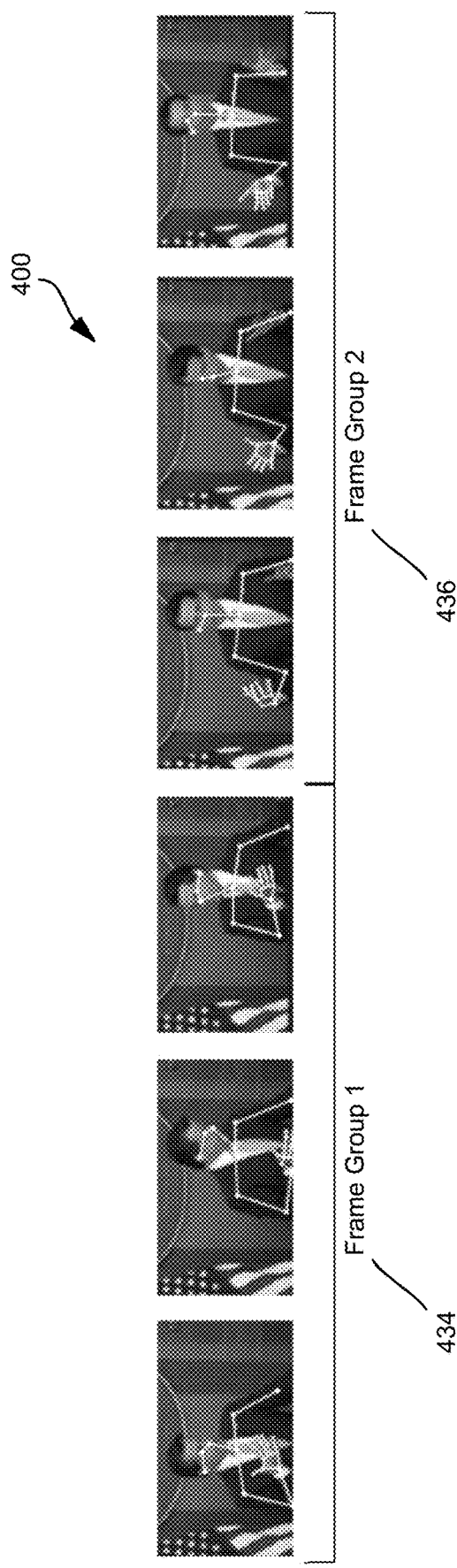
FIG. 4 depicts a grouped set of training frames in sequential order, according to embodiments of the present technology.
Figure 5:
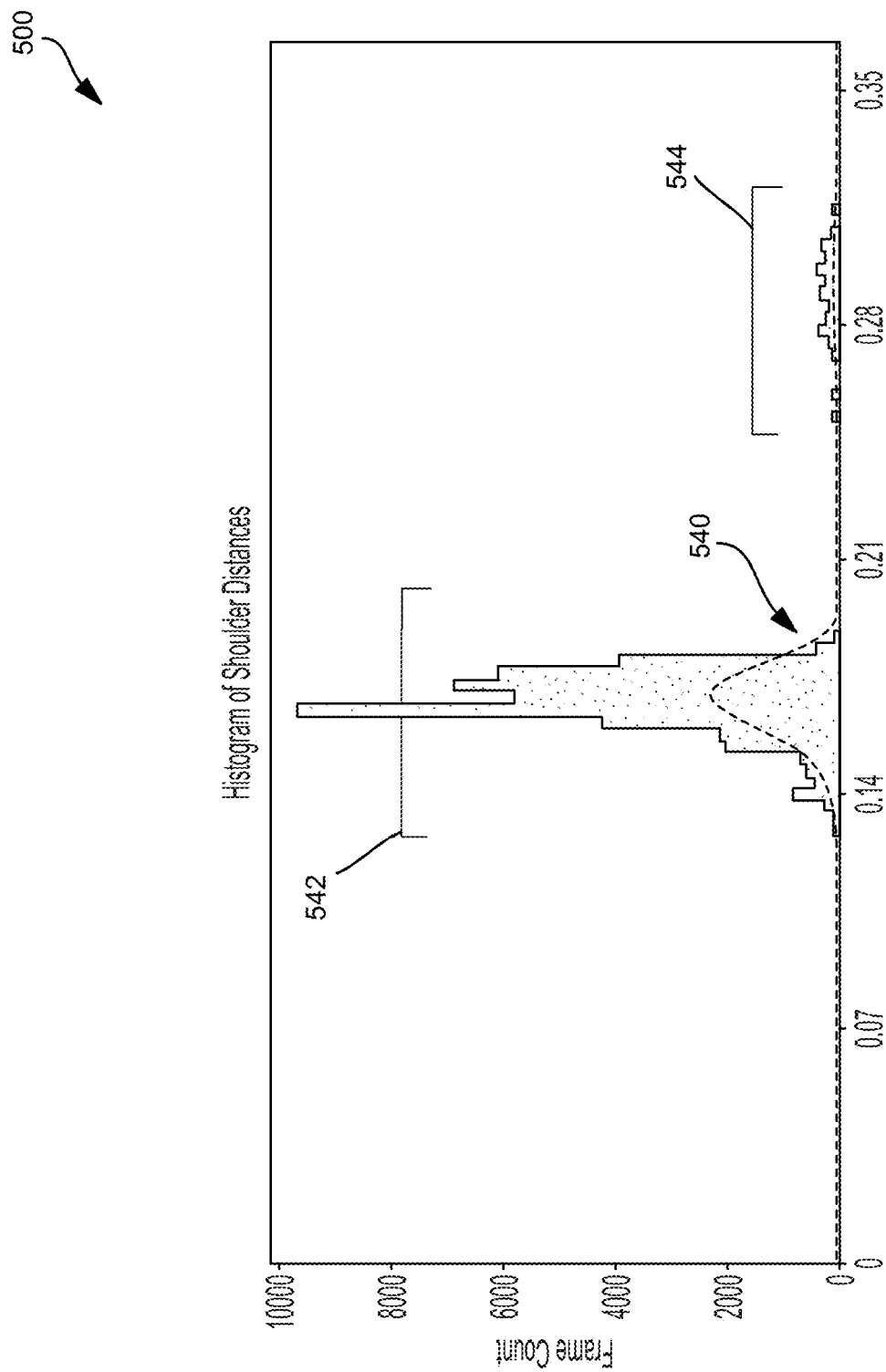
FIG. 5 depicts a histogram including intra-shoulder distances calculated for each frame and generated by a pose selection system, according to embodiments of the present technology.

Referring back to FIG. 2, step 206 includes identifying a hand type of the subject for each frame. In some embodiments, the pose selection system analyzes the sets of joint positions for each frame to determine a hand type for each frame. For example, the pose selection system identifies a particular frame as a left hand frame, a right hand frame, or a both left hand and right hand frame. The pose selection system divides up the frames and groups the frames based on their hand type, as shown in FIGS. 4 and 5. Furthermore, the pose selection system identifies a particular frame as a "no hand" frame. A frame may be identified as a no hand frame because the frame includes the subject but does not include any of the subjects hands, or because the frame does not include the subject at all. In some embodiments, such frames are filtered out and discarded from the set of training frames because training frames that include zero or more than two people, or that do not include the subject, are not useful in the process of the pose selection system facilitating animation of the subject.

In some embodiments, one or more characteristics of the subject are used instead of or in addition to hand type to group the frames. For example, a characteristic associated with the subject's face, head, hair, arms, or other body parts may be used. In some embodiments, a characteristic of the subject's voice, such as pitch, volume, etc., may be used. In some embodiments, the frames are grouped using just the joint positions of the subject in each frame, and without using any additional characteristics, such as hand types.

If two or more subjects are identified in a frame, the pose selection system determines which subject is the featured subject, or in other words, the subject that will be featured in the animation as facilitated by the pose selection system and generated by the animation generation system. Determining which subject of the multiple subjects is the features subject may be accomplished in a variety of ways. For example, the pose selection system may determine a bounding box for each subject and a centroid for each bounding box. The pose selection system determines that the featured subject will be the subject with a bounding box centroid closest to the center of the image. Alternatively, or in addition, the pose selection system determines which subject is the featured subject by analyzing characteristics (e.g., joint positions, movements, clothing, physical features of subjects body, etc.) of each subject and comparing those characteristics to the characteristics of subjects in other frames, such as frames that include only one subject. In some embodiments, instead of determining which subject is the featured subject, a frame with two or more subjects may be excluded altogether.

In some embodiments, the pose selection system uses the feature vector associated with each frame to determine a hand type for that frame. As noted, the feature vector includes the upper body pose of the subject in the frame, such as data associated with the subject's arm, hand, head, and other body part positions, including the extracted joint positions. The dimensionality of the feature vector for a particular frame depends on the number of hands that are visible in the frame. To determine if a hand is visible in a frame, the pose selection system determines a number or percentage of the hand joints in the hand that are within the outer bounds of the image captured by the frame. For example, the pose selection system determines that a hand is visible in the frame if 75% or more of the hand joints are within the bounds of the frame. In other embodiments, the pose selection system determines that a hand is visible if a certain number or percentage of a specific type of joint in the hand are visible. For example, the pose selection system determines that a hand is visible (or that the system is confident that the hand is visible) if three or more fingertip joints on a the hand are visible. If one hand is visible, the frame is determined to be either a left hand or right hand frame, depending on whether the hand determined to be visible is the subject's left hand or right hand. If two hands are visible, the frame is determined to be a both left and right hand frame. If zero hands are visible, the frame is determined to be a no hands frame, and it may be discarded or filtered. When the pose selection system outputs or displays frames for selection by a user, the frames are organized based on their hand type.

Referring back to FIG. 2, step 208 includes grouping the plurality of frames into frame groups. A frame group is a group of frames that represent a distinct pose by the subject in the training video. A frame group includes a set of consecutive frames, and represents a single pose of the subject. To determine how the plurality of frames should be grouped into frame groups, the pose selection system may use the hand type for each frame, or the set of joint positions for each frame, or both. More specifically, to construct the frame groups, the pose selection system analyzes each frame in consecutive (temporal) order. When a group is started, the next analyzed frame is added it to the current frame group unless the analysis determines that the frame does not belong in that frame group. For example, the analysis determines that the hand type of the frame is different than the previous frame, or in other words the last frame to be added to that frame group. In another example, the analysis determines that the Euclidean distance between the frame's feature vector and the feature vector of the last frame in the frame group is greater than a particular threshold (e.g. a threshold of 60). If a frame does not belong in the current frame group, a new frame group is started, and the frame is put in that new frame group.

An example set of frame groups are shown in FIG. 4. FIG. 4 depicts a grouped set of training frames in sequential order, according to embodiments of the present technology. The training frames, such may be similar to, for example, training frames 109 in FIG. 1, are grouped into two training frame groups, 434 (frame group 1) and 436 (frame group 2). As can be seen by comparing frame group 434 and frame group 436, the frames within each group include the same hand type.

Referring back to FIG. 2, step 210 includes identifying a representative frame for each frame group. In some embodiments, the representative frame for a frame group is determined using the frame groups determined in step 208, and using the feature vectors associated with the frame group. A representative frame for a frame group is determined using a variety of different processes. In some embodiments, the frame that is in the middle of the frame group is designated as the representative frame for the group. More specifically, the middle frame of the frame group includes the frame that is in the temporal middle of the frame group, or in other words the frame that represents the temporal center of the range of time that the frame group represents. In some embodiments, the frames are "averaged" using data in the feature vectors of each frame to determine which frame should be the representative frame. For example, the joint position data is averaged to determine which frame includes joint positions that represent the average physical position of the subject's hands, arms, and head. Both the frame, and the feature vector associated with that frame, may be used to represent the entire frame group, such as for the clustering step 212 described herein.

Dividing the set of frames into frame groups, and identifying a representative frame for each frame group, significantly reduces computational cost of the pose selection system and animation generation system as described herein since any applications or algorithms used to process the frames are processing on only a subset of the frames (i.e., the representative frames from each frame group) instead of the entire set of frames from the video.

In some embodiments, before or after frames from a video are divided into frame groups, frames from the video are normalized. A video may include multiple camera angles, and the different cameras that capture the video streams at different camera angles may move. For example, if a camera moves closer to or farther away from a subject, the subject may appear in the video to be larger or smaller as compared to other portions of the video. Therefore, in some embodiments, the pose selection system normalizes the different frames extracted from the video to account for these differences. To normalize the frames, the pose selection system estimates the scale of the subject in each frame by computing a specific distance that is calculable in each frame, such as, for example, the intra-shoulder distance (e.g., pixel distance) of the subject. More specifically, the intra-shoulder distance is determined relative to the frame's diagonal. The pose selection system generates a histogram based on the intra-shoulder distances of each frame.

FIG. 5 depicts a histogram 500 including intra-shoulder distances calculated for each frame and generated by a pose selection system, according to embodiments of the present technology. Histogram 500 represents a distribution of the intra-shoulder distances calculated for frames across a video, such as a training video. To reduce noise, the pose selection system smooths the distribution with a filter 540 (e.g., a Gaussian filter), as shown in FIG. 5. The pose selection system identifies sets of frames with the same or approximately the same subject scale by splitting the histogram into sections with boundaries at the local minima of the smoothed counts. For example, the histogram 500 in FIG. 5 is divided into two sections, section 542 and section 544. For each section, the pose selection system computes a normalization factor. A normalization factor is determined by dividing the median inter-shoulder distance of the inter-shoulder distances within a section and dividing it by the median distance for the entire video. The pose selection system then normalizes the feature vector for each frame with the corresponding normalization factor.

In some embodiments, the pose selection system determines outlier frames or sections that are filtered and discarded, or designated as a no hands pose. For example, a section that includes a low number of frames (e.g., fewer than 1% of all frames in the video) represents a quick zoom or cut to different subjects, or quick movements of the subject (e.g., the subject turning to the side).

Referring back to FIG. 2, step 212 includes clustering the frame groups into clusters. In some embodiments, the pose selection system clusters the frame groups into clusters using the representative frames of each frame group as determined in step 210. Each cluster includes frame groups (or representative frames of frame groups) that are different representations of a pose of the subject. In other words, different representative frames in a cluster may include slight variations of what the pose selection system determines to be the same or a similar pose. Clusters are used as candidate poses to be presented to a user (e.g., an artist) on a user interface (e.g., a pose selection interface) so that the user may select poses for animation.

Figure 6:
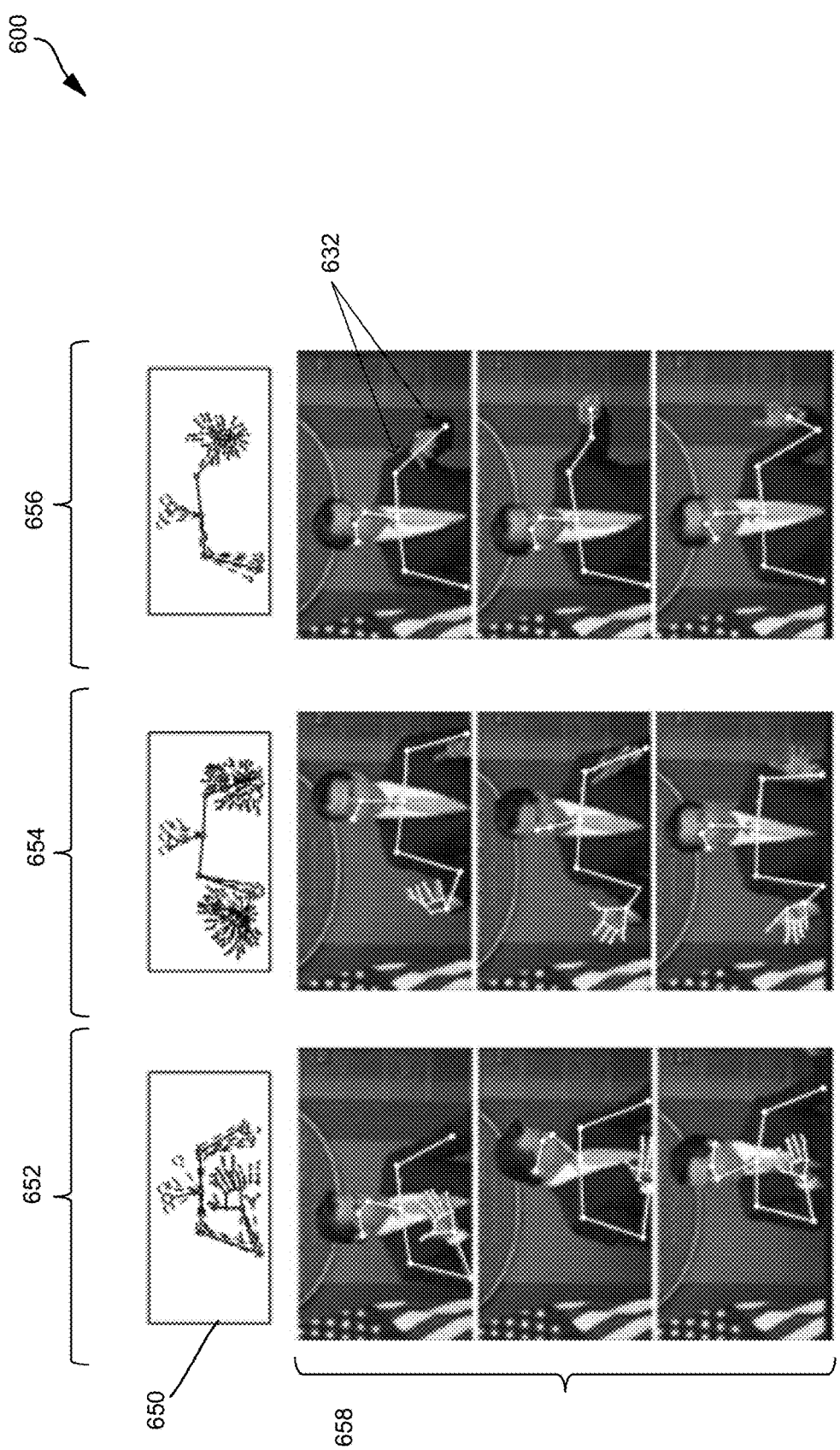
FIG. 6 depicts clusters including a visualization of each cluster and example representative frames from the frame groups in each cluster, according to embodiments of the present technology.

An example of a set of clusters of frame groups is shown in FIG. 6. FIG. 6 depicts clusters 600 including a visualization of each cluster and example representative frames from the frame groups in each cluster, according to embodiments of the present technology. Clusters 600 include three clusters, cluster 652, cluster 654, and cluster 656. Cluster 652 in FIG. 6 includes a visualization 650 of cluster joint positions of cluster 652 and example frame groups 658 from cluster 652. Visualization 650 includes, for example, a summary image that depicts a summary of the joint positions from frames (or representative frames from frame groups) for a cluster. Each example representative frame visualization includes a visualization of one or more joint positions 632 of the subject in the representative frame. The pose selection system clusters frame groups using a variety of different factors. First, the pose selection system clusters frame groups to each include frame groups that represent the same or a similar pose. Second, the pose selection system clusters frame groups by hand type such that each cluster includes frame groups that represent the same hand type. For example, cluster 652 includes right hand frame groups, cluster 654 includes both right and left hand frame groups, and cluster 656 includes left hand frame groups.

Visualization 650 of cluster 652 includes a set of joint positions that represent each of the frame groups in the cluster 652. The sets of joint positions are shown in the visualization as overlapping so that the different sets of joint positions are visualized with respect to each other. For example, each set of joint positions are shown, as in FIG. 7, anchored at one of the joints, such as at the wrist joint, so that the other joint positions of a frame group are visualized relative to the same joints for other frame groups. The visualization 650 in FIG. 6 does not include sets of joint positions for each frame in cluster 652, but instead includes sets of joint positions for representative frames from each frame group in the cluster. However, such a visualization includes more or fewer sets of joint positions, such as a set of joint positions for each frame in the cluster, or only sets of joint positions for a subset of the representative frames from the frame groups in the cluster.

Figure 7:
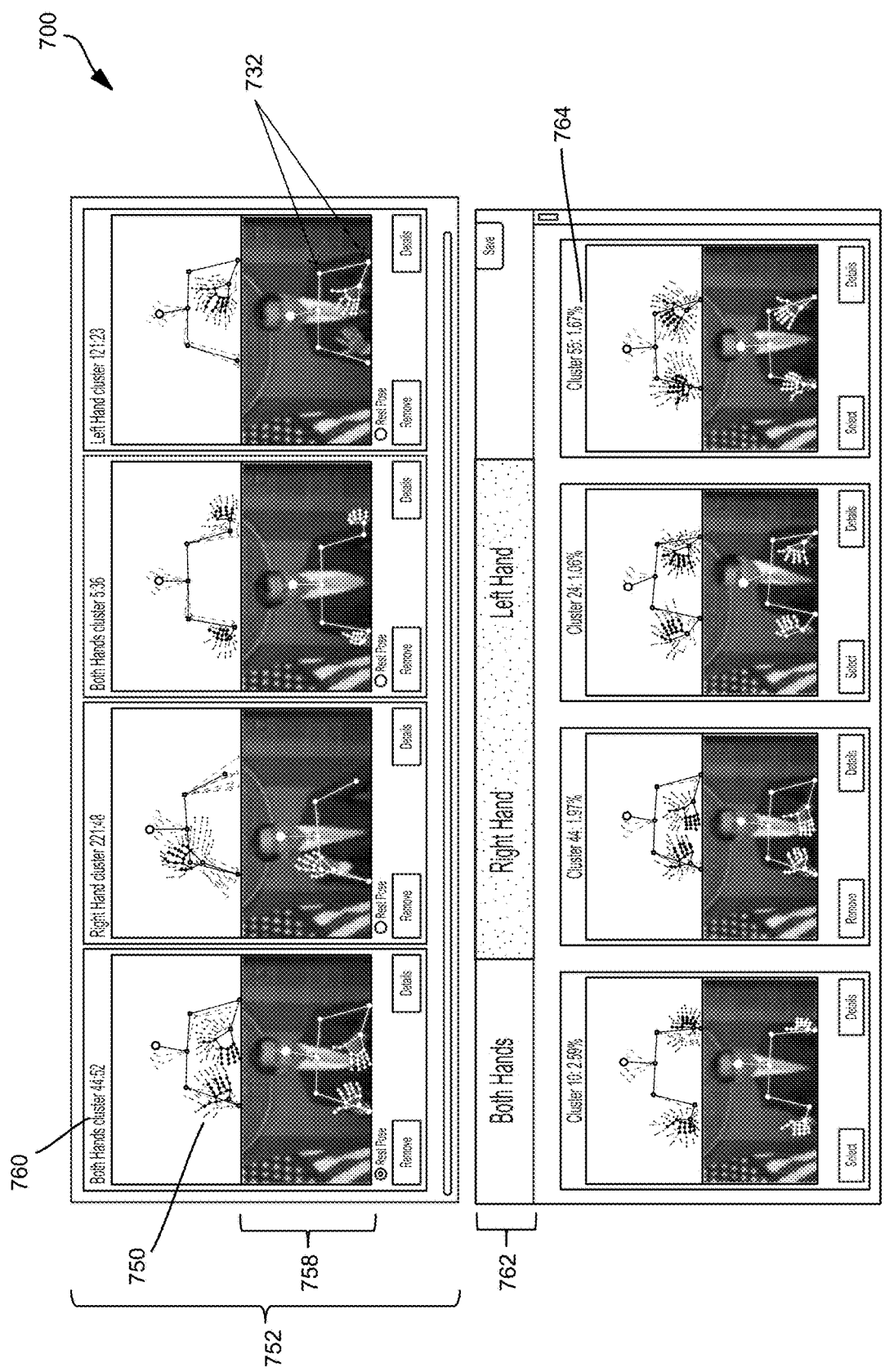
FIG. 7 depicts a pose selection interface that includes visualizations of clusters for selection by a user, according to embodiments of the present technology.

Referring back to FIG. 2, step 214 includes outputting a visualization of the clusters at a user interface. As noted, the visualizations of the clusters are generated and/or presented using the hand type of the subject for each cluster (i.e., using the hand type of the subject in each frame for each cluster). An example visualization of the candidate clusters for selection by a user is shown in FIG. 7. FIG. 7 depicts a pose selection interface 700 that includes visualizations of clusters for selection by a user, according to embodiments of the present technology. Interface 700 includes, for example, a visualization 752 of a cluster. The visualization 752 includes a visualization of sets of joint positions 750 for the frame groups in the cluster, similar to the sets of joint positions 650 described with respect to FIG. 6. The visualization 752 also includes a visualization of a representative frame 758 from a frame group in the cluster. In some embodiments, the representative frame 758 also shows a set of joint positions associated with the subject in the representative frame 758.

In some embodiments, pose selection interface 700 also includes various information regarding the clusters. For example, cluster 752 includes hand type information 760. For example, as shown in FIG. 7, cluster 752 is a both hands (both right and left hands) cluster. In other words, cluster 752 includes frame groups, and therefore frames, that are both right and left hand frame groups. Pose selection interface 700 also includes various buttons to select or remove a selected cluster, and to view more information about a cluster. For example, a user selects the "Details" button to obtain more detailed information about a cluster, such as to view the frame groups in the cluster, such as representative frames from those frame groups, individual frames from the cluster, GIFs of different video frame sequences associated with the pose (e.g., sorted based on their similarity to an "average" pose in the cluster), among others. In some embodiments, additional details, such as statistics regarding a cluster, are also included in the pose selection interface 700. For example, information 764 includes a percentage of frames that are included in the cluster associated with the information 764. In some embodiments, the pose selection system calculates, based on the number of frames in a cluster, a percentage of the total frames from the input video (e.g., training video) included in the cluster. The pose selection system then ranks and display the cluster visualizations on the interface 700 in order of highest to lowest percentage of frames from the training video. This functionality can also help the user interpret and decide on the appropriate selection of representative poses for the character.

Furthermore, as noted, the pose selection system determines, for each frame, a hand type, and then groups the frames and clusters the frame groups based on, at least partially, the hand types. As shown in FIG. 7, the pose selection interface 700 allows for a user to organize the clusters in the pose selection interface 700 based on hand type. For example, a user selects, using the hand type selection interface buttons 762, both hands, right hand, or left hand. After a user selects a hand type, the pose selection interface 700 adjusts to show only clusters with the selected hand type, and hide any other clusters that don't fit the selected hand type.

Referring back to FIG. 2, step 216 includes receiving a selection of a cluster for animation of the subject. According to some embodiments, a user, such as an artist, selects certain clusters from the clusters generated by the pose selection system. A user selects certain clusters, or certain poses, for a variety of different reasons. For example, since a user uses the animation generation system as described herein to generate an animation of the subject using renderings of a character that represents the subject, the user selects poses of the subject from the training video that are unique to the subject, show the subject's personality or unique physical traits, among other reasons. The user generates renderings of a character, which represents the subject from the training video, to be used to generate an animation of the character using the animation generation system, according to embodiments of the present technology.

In some embodiments, a visualization may not be outputted for a user to select poses from the clusters of poses. Instead, the pose selection system or animation generation system automatically analyzes and selects poses for animation. Furthermore, in some embodiments, character poses are also not generated by a user, but rather are previously stored character poses that are automatically selected and associated with the selected poses by the pose selection system or animation generation system. In some embodiments, the character poses were previously generated by a user (e.g., artists), were automatically generated by a computer, or a combination of both. In some embodiments, character poses are frames from the training video or another video of the subject. Therefore, character poses are not necessarily renderings, but may also be frames from a live or recorded video of the subject. In such embodiments, animations may be generated using "character poses" that are frames from a video of the subject. In some embodiments, a visualization is be outputted, but not necessarily used for selection of poses by a user, and rather is just used for a visualization for the user.

In some embodiments, one of the clusters selected by the user is designated as a "rest pose." In some embodiments, the rest pose is a pose that the subject returns to whenever the subject is not explicitly striking another, more expressive pose. In some embodiments, the pose selection system automatically selects a pose to be designated as the rest pose, such as the first pose selected by the user. Alternatively, the user selects a pose to be designated as a rest pose. Alternatively, the pose selection system analyzes the poses to determine which of the poses is least expressive based on the joint positions in each cluster, and designate the resulting pose as the rest pose.

Referring back to FIG. 1, a processing device executes one or more video processing modules 108 (or suitable other program code) to implement blocks 202-216 in FIG. 2. For example, the program code for the video processing module 108, which is stored in a non-transitory computer-readable medium, is executed by one or more processing devices. Executing the video processing module 108 causes the processing device to access the training video 104 and/or performance video 106 from the same non-transitory computer-readable medium or a different non-transitory computer-readable medium. In some embodiments, accessing the training data involves communicating, via a data bus, suitable signals between a local non-transitory computer-readable medium and the processing device. In additional or alternative embodiments, accessing the training data involves communicating, via a data network, suitable signals between a computing system that includes the non-transitory computer-readable medium and a computing system that includes the processing device.

Referring back to FIG. 2, FIG. 2 depicts a flow chart of method 200. Operations 202-216 in method 200 can implement a step for extracting and processing poses of a subject from a training video. The step for extracting and processing poses of a subject from a training video may include each of the operations in blocks 202-216, or a subset of those operations. Block 202 involves obtaining a training video of a character wherein the training video includes a plurality of frames with poses performed by the subject. Block 204 involves extracting sets of joint positions from the training video. Block 206 involves identifying a hand type of the character for each frame of the plurality of frames. Block 208 involves grouping the plurality of frames into frame groups. Block 210 involves identifying a representative frame for each frame group. Block 212 involves clustering the frame groups into clusters. Block 214 involves outputting a visualization of the clusters at a user interface. Block 216 involves receiving a selection of a cluster for animation of the character. One or more of blocks 202-216 may be excluded from the step for extracting and processing poses of a subject such that the method 200 may include fewer than all of operations 202-216. For example, operation 202 (obtaining a training video of a character wherein the training video includes a plurality of frames with poses performed by the subject) may be excluded from some embodiments.

FIG. 8 depicts a flow chart of an example process 800 for facilitating pose selection and animation generation, according to embodiments of the present technology. Step 802 of process 800 includes, for example, outputting a visualization of training poses at a user interface. In some embodiments, the training poses represent clusters of training frames from a training video. The training frames each include a pose of the subject from the training video. Step 802 of process 800 is similar or the same as step 214 of process 200 in FIG. 2. The visualizations of the training poses are in the form of clusters as described herein and as shown in FIG. 7. For example, the visualizations are generated and/or presented using the hand type of the subject for each cluster (i.e., using the hand type of the subject in each frame for each cluster).

Step 804 includes obtaining a selection of training poses at the user interface. Step 804 of process 800 is similar or the same as step 216 of process 200 in FIG. 2. According to some embodiments, a user, such as an artist, selects certain training poses from the training poses generated by the pose selection system. The user generates renderings of a character, which represents the subject from the training video, to be used to generate an animation of the character using the animation generation system, according to embodiments of the present technology. The renderings of the character are received from the user, and are uploaded to the animation generation system at, for example, the user interface. In some embodiments, characters are already stored on a storage medium at the user interface or remotely accessible. For example, character renderings associated with a subject may have been previously generated by an artist, or elsewhere, and stored for later use.

Step 806 includes associating each training pose from the selection of training poses with a character pose. If character poses are generated by a user after the user selects training poses, the character poses are naturally associated with corresponding training poses since the user may have generated the character poses to correspond to the training poses that were selected. If character poses are not generated by a user after the user selects training poses, and, for example, previously stored character poses are used, the animation generation system analyzes the character poses and training poses and match the selected training poses to corresponding character poses using a software application, such as a facial or other recognition software.

Figure 9:
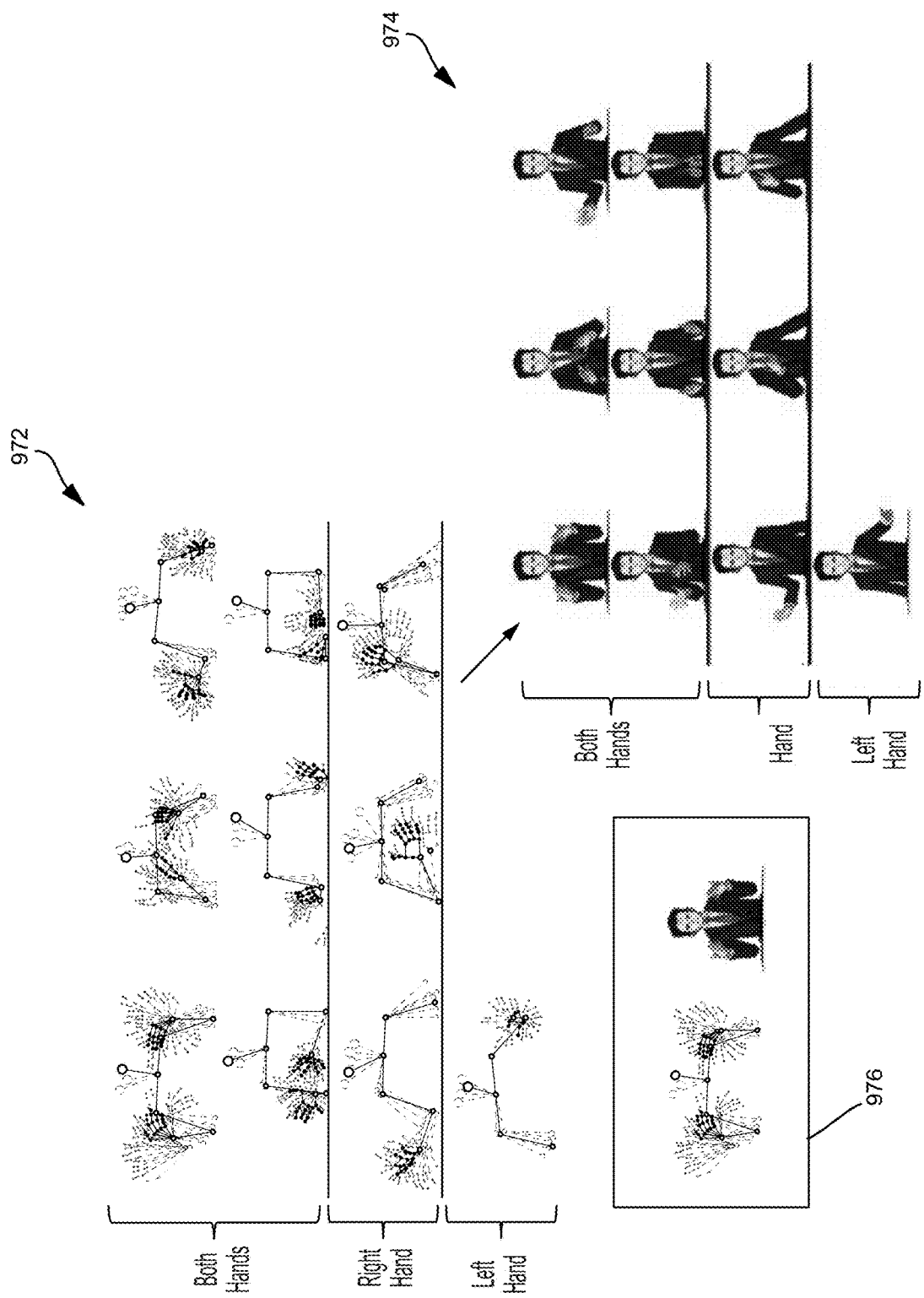
FIG. 9 depicts a set of training poses and corresponding character poses generated by a user who selected the training poses, according to embodiments of the present technology.

An example set of selected training poses and their corresponding character poses are shown in FIG. 9. FIG. 9 depicts a set of training poses 972 and corresponding character poses 974 generated by a user who selected the training poses, according to embodiments of the present technology. The set of training poses 972 are shown in FIG. 9 as sets of joint positions, where each set of joint positions represents a cluster of frame groups. The sets of joint positions each represent a different representative frame from a frame group in a cluster. The sets of joint positions for each training pose are shown in the visualization as overlapping so that the different sets of joint positions are visualized with respect to each other. For example, each set of joint positions are anchored at one of the joints, such as at the wrist joint, so that the other joint positions in the cluster are visualized relative to the same joints for other frame groups. After a user selects the clusters of training poses 972, the user generates corresponding character poses 974. For example, each character pose 974 corresponds directly to a selected training pose 972, as shown in training and character pose comparison block 976. As such, each selected training pose 972 is assigned to or associated with a character pose 974.

One or more of steps 802-816 may be excluded from the process 800 such that the method 800 may include fewer than all of steps 802-816. For example, blocks 802-806 may be excluded. In some embodiments, as a replacement for steps 802-806, an additional step may be included. The additional step may include, for example, obtaining a selection of training poses of the subject and a set of character poses. In some embodiments, each training pose from the selection of training poses is associated with a character pose from the set of character poses. In some embodiments, the training poses represent clusters of training frames from a training video, the training frames each including a pose of the subject from the training video.

Referring back to FIG. 8, step 808 includes obtaining a performance video of the subject. In some embodiments, the performance video is retrieved from a non-transitory computer-readable medium where it is being stored. In some embodiments, the performance video includes a plurality of performance frames that include poses performed by the subject. Step 808 of process 800 is similar or the same as step 202 of process 200 in FIG. 2, except that step 808 includes obtaining a performance video instead of a training video. A performance video differs from a training video in that a training video is used for "training," or in other words as part of training a pose selection system to generate representative poses for pose selection, according to embodiments of the present technology. On the other hand, a performance video is used for "performance" as part of an animation generation system to generate an animation of a subject in the performance. However, while training and performance videos are used for different purposes within the pose selection and animation generation system described herein, training and performance videos are of the same type, and may otherwise be interchangeable. While training and performance videos both include a subject that the pose selection and animation generation system will use as part of an animation (e.g., using an animation character that represents the subject), the subjects in the training and performance videos may be different people. A performance video is ultimately a video that a user wants to animate, while a training video is a video that the user wants to use to collect poses that represent the subject well so as to generate an accurate animation of the performance video.

Step 810 includes grouping the plurality of performance frames from the performance video into groups of performance frames. The grouping of the plurality of performance frames are performed by a processing device. In some embodiments, a group of performance frames includes a set of consecutive frames of the plurality of performance frames. In some embodiments, a group of performance frames represents a performance pose of the subject. In other words, a group of performance frames each represent the same pose, such as because a group of performance frames are consecutive frames from the performance video. Step 810 of process 800 is similar or the same as step 208 of process 200 in FIG. 2, except that step 810 includes grouping performance frames from a performance video instead of frames from a training video. Therefore, the animation generation system outputs a set of groups of performance frames after grouping, such as using the methods described with respect to FIGS. 2 and 4.

Grouping the performance frames from the performance video into groups of performance frames include use of data associated with the performance frames, such as, for example, joint positions associated with the subject in the performance frames. Similar to as noted with respect to step 204 in FIG. 2, in some embodiments, the animation generation system extracts performance frames from the performance video, and also extract other data from the performance video. For example, the animation generation system analyzes the performance video or the performance frames to identify the subject in each frame, and determine joint positions associated with the subject's body parts, such as the subject's head, hands, and arms. In some embodiments, each set of joint positions is associated with a different frame of the performance video. Since each frame represents a different snapshot from a different temporal portion of the performance video, each frame includes different joint positions. Other related data may be extracted from the performance video or its performance frames, such as coordinates for each joint position (e.g., in (x, y) format), confidence scores for each joint or body part position, among others. The animation generation system generates a feature vector for each frame. The feature vector for a particular frame includes data associated with that frame, such as including the extracted joint positions, confidence stores, or other data associated with the training video or frame. In some embodiments, the joint positions and/or other data are applied to visual representations of the extracted frames.

The joint position data included in a feature vector for a frame includes a variety of different data points. In some embodiments, the joint positions include coordinate values of each wrist joint in the frame relative to the neck joint in the frame. In some embodiments, the joint positions include distances from each fingertip to that finger's corresponding wrist joint. Data associated with gross arm movements (e.g., wrist positions) and more fine-grained movements (e.g., hand shape, including finger joint positions) are captured and included in the feature vector associated with a frame.

In some embodiments of the present technology, a performance video is processed without grouping the frames of the performance video before clustering. For example, the clustering is performed on ungrouped frames from the performance video. Such a process of clustering ungrouped frames may take a longer amount of time than clustering grouped frames.

Step 812 includes assigning a selected training pose from the selection of training poses to each group of performance frames using the clusters of training frames. The animation generation system assigns a training pose, and therefore an animation character, to a group of performance frames based on a variety of factors. For example, the animation generation system uses dynamic programming to match a group of performance frames with the training pose of the selected set of training poses that most closely resembles the group of performance frames as a whole, or a representative frame from the set of training poses. In some embodiments, the animation generation system matches a group of performance frames with the training pose of the selected set of training poses that contributes to the most accurate animation of the performance video (e.g., even if the training pose matched with the group of performance frames is not the absolute best match from the set of selected training poses).

Mapping selected training poses to groups of performance frames includes new methods rooted in dynamic programming. To determine how groups of performance frames should be matched with training poses, the animation generation system optimizes the following energy function (Function 1):

$$E(\{a_1, a_2, \ldots, a_n\}) = \sum_{j=i}^{m \ll n} \overline{k_L \cdot E_L(a_j^*)}^L + \overline{k_P \cdot E_P(a_j^*)}^P \quad \text{Function 1}$$

where $a_j^*$ is the jth contiguous run of groups of performance frames with the same held pose assignment (i.e., a "segment"); m is the number of segments; $E_L$ is a length energy that prevents each segment from being too short; $E_P$ is a pose energy that measures the similarity of an assigned training pose to the poses in the corresponding performance frame groups; and ($k_L$, $k_P$) are weights that manage and trade off the importance of the length and pose energy terms within Function 1.

More specifically, Function 1 includes two main terms. Function 1 includes a pose term P, which controls how closely a pose (i.e., a selected training cluster, or pose) matches a frame of a group of performance frames. Function 1 also includes a length term L, which controls the smoothness of the final animation as generated by the animation generation system. If the energy function, Function 1, only included the pose term, or pose energy, the resulting animation generated by the animation generation system may be jittery since the length term, which controls the smoothness of the animation, is not included. On the other hand, if the energy function, Function 1, only included the length term, or length energy, the resulting animation generated by the animation generation system may not match (or come close to matching) the performance video since the pose term, which controls how closely a pose matches a frame, is not included.

The length term from Function 1, or length energy, applies a quadratic drop off to penalize segments (i.e., groups of performance frames) that are shorter than a threshold ($\phi_L$), as represented by the following function (Function 2):

$$E_L(a_j^*) = \begin{cases} \left(\frac{3n_j - \phi_L}{\phi_L}\right)^2 & \text{if } n_j < \max(c_L, \phi_L) \\ 0, & \text{otherwise} \end{cases} \quad \text{Function 2}$$

where $n_j$ is the total number of frames in the group of performance frames, and $c_L$ is the average length of all the training frame groups in the corresponding pose cluster.

The pose term, from Function 1, or pose energy, is defined by the following function (Function 3) with respect to a group of performance frames:

$$E_p(a_j^*) = \sum_{i=0}^{n_j} d(p(a_j^*), p_{j,i}) \quad \text{Function 3}$$

where $p_{j,i}$ is the extracted pose from the ith video frame of the jth segment in the assignment; $p(a_j)$ is the pose closest to the assigned cluster's centroid; and $d(p_1, p_2)$ is the distance between two poses. To determine a measurement of similarity between two poses, such as a pose associated with a training cluster and a pose represented by a group of performance frames, the animation generation system determines a pose distance. In some embodiments, the animation generation system uses hand types for the two poses to determine the pose distance. If the pose types for the two poses match, then the animation generation system uses a Euclidean distance between the feature vectors of the two poses. If the pose types do not match, the animation generation system sets the pose distance to a constant $k_D$. If the ith video frame does not have a pose (e.g., the frame does not include any people or the frame does not include any visible hands), then the animation generation system uses the Euclidean distance between the assigned pose cluster and the rest pose cluster.

In some embodiments, frame assignment algorithm (Function 1) includes constants. For example, the algorithm includes constants $k_L$, $k_P$, $k_D$, and $\phi_L$. The constants control the relative strengths of the energies, how likely a pose is to switch to a different hand type, and how short segments should be. For example, values of $k_L=2$, $k_P=1$, $k_D=0.7$, and $\phi_L=15$ may be used.

Referring back to FIG. 8, step 814 includes generating a sequence of character poses based on the groups of performance frames and their assigned training poses. Once the animation generation system has assigned the groups of performance frames to the selected training poses, the animation generation system generates an animation using the assigned training poses and their associated character poses. Step 816 includes outputting the sequence of character poses. For example, the sequence of character poses, or the animation generated by the animation generation system, is outputted to the user interface, stored locally, or transmitted to another device for storage or use (e.g., for presentation).

The animation generation system applies techniques to the sequence of character poses, or the animation, to improve the accuracy of the sequence as compared to the performance video. For example, the animation generation system applies continuous motion to the sequence so as to more smoothly transition between character poses in the animation.

Figure 10:
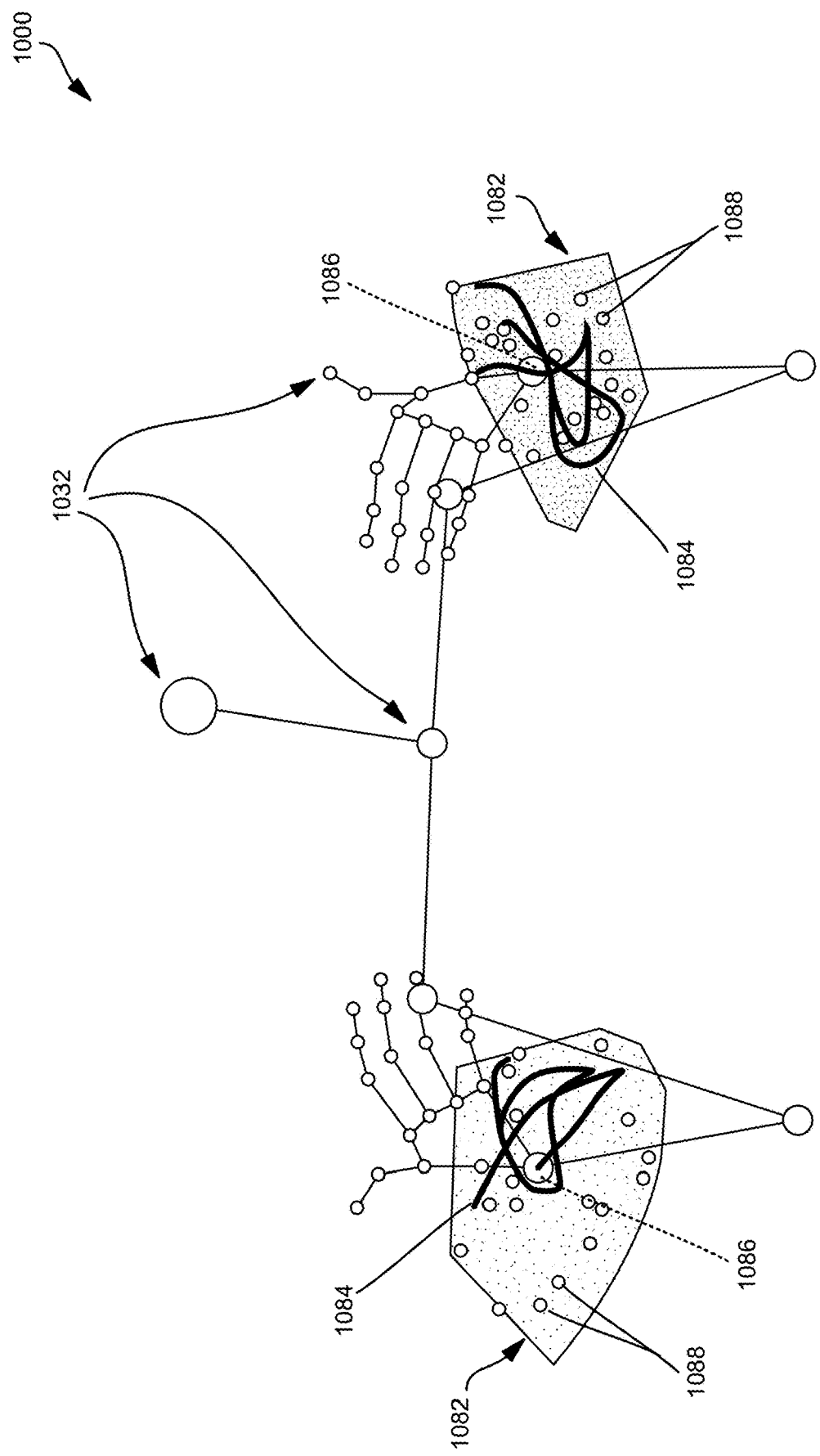
FIG. 10 depicts visualization of an example set of joint positions from an example cluster on which continuous motion techniques are applied, according to embodiments of the present technology.

FIG. 10 depicts visualization 1000 of an example set of joint positions 1032 from an example cluster on which continuous motion techniques are applied, according to embodiments of the present technology. Visualization 1000 includes two convex hulls 1082, one associated with each hand and arm of a subject in a training video. The convex hulls 1082 represent a range of positions of a particular joint (in this case, the wrist joints 1086) for any frame or frame group within a particular cluster. In other words, the boundaries of the convex hull for a particular hand represents the outer range of position of wrist joint 1086 during any of the frames within that cluster. The different locations of wrist joint 1086 is represented in FIG. 10 by wrist joint positions 1088. In some embodiments, the animation generation system generates the convex hulls by aligning all of the cluster poses spatially based on the position of the wrist joint (e.g., with respect to another joint, such as the neck joint) so that the joint positions occupy a shared space, and then the animation generation system compute the convex hull of the wrist joint positions. Using a convex hull for a particular hand (i.e., side), the animation generation system computes and generates a Bezier curve inside the convex hull, or in other words a randomized path for that hand based on the hand's movements for that cluster. In some embodiments, the animation generation system generates the Bezier curve by starting at the wrist position for the center frame of the cluster, and add Bezier control points one at a time by translating along a randomly varying vector. At each iteration, the animation generation system rotates the vector by a random angle between −90 and 90 degrees and scale the vector by a sine function that has an amplitude is between 50% and 175% of the square root of the convex hull's area. If the resulting vector moves the control point outside the convex hull, the animation generation system constructs a new random vector until it obtains one that stays within the boundary. The animation generation system deforms the artwork by moving a control handle positioned near the character's wrist along the motion path. The animation generation system then moves the character's wrist along the Bezier curve to animate continuous motion when, for example, transitioning from character pose to character pose.

Other techniques may also be used to increase continuous movement during an animation. For example, the animation generation system removes groups of performance frames, and therefore their assigned training clusters and character poses, that do not have sufficient length (creating, for example, updated, smaller groups of performance frames).

Groups of performance frames that are shorter than a threshold length of frames may cause the animation to switch too quickly from character pose to character pose, causing the animation to look jittery or have other drawbacks. To filter such shorter groups of performance frames, the animation generation system determines a length of each group of performance frames from a performance video. In some embodiments, the length of a group of performance frames includes a specific number of performance frames in the group of performance frames. However, the length of a group of performance frames may be determined using alternative methods or measurement techniques. The animation generation system then removes groups of performance frames that have a length below a threshold length. The animation generation system then assigns each group of remaining performance frames to a training pose of the selection of training poses. In other words, after filtering out the shorter groups of performance frames, the animation generation system only uses the remaining groups of performance frames to generate the animation.

Referring back to FIG. 8, FIG. 8 depicts a flow chart of method 800. Operations 802-816 in method 800 can implement a step for animating a character using poses from video frames of a subject. The step for animating a character using poses from video frames of a subject may include each of the operations in blocks 802-816, or a subset of those operations. Block 802 involves outputting a visualization of training poses at a user interface, the training poses represent clusters of training frames from a training video, the training frames each including a pose of the subject from the training video. Block 804 involves receiving a selection of training poses. Block 806 involves associating each training pose from the selection of training poses with a character pose. Block 808 involves obtaining a performance video of the subject, the performance video including a plurality of performance frames that include poses performed by the subject. Block 810 involves grouping the plurality of performance frames into groups of performance frames. Block 812 involves assigning a selected training pose from the selection of training poses to each group of performance frames using the clusters of training frames. Block 814 involves generating a sequence of character poses based on the groups of performance frames and their assigned training poses. Block 816 involves outputting the sequence of character poses.

One or more of blocks 802-816 may be excluded from the step for extracting and processing poses of a subject such that the method 800 may include fewer than all of operations 802-816. For example, blocks 802-806 may be excluded. In some embodiments, as a replacement for blocks 802-806, a separate block may be included, which involves obtaining a selection of training poses of the subject and a set of character poses. In some embodiments, each training pose from the selection of training poses is associated with a character pose from the set of character poses. In some embodiments, the training poses represent clusters of training frames from a training video, the training frames each including a pose of the subject from the training video.

Example of a Computing System for Providing a Consumer Reaction Model

Figure 11:
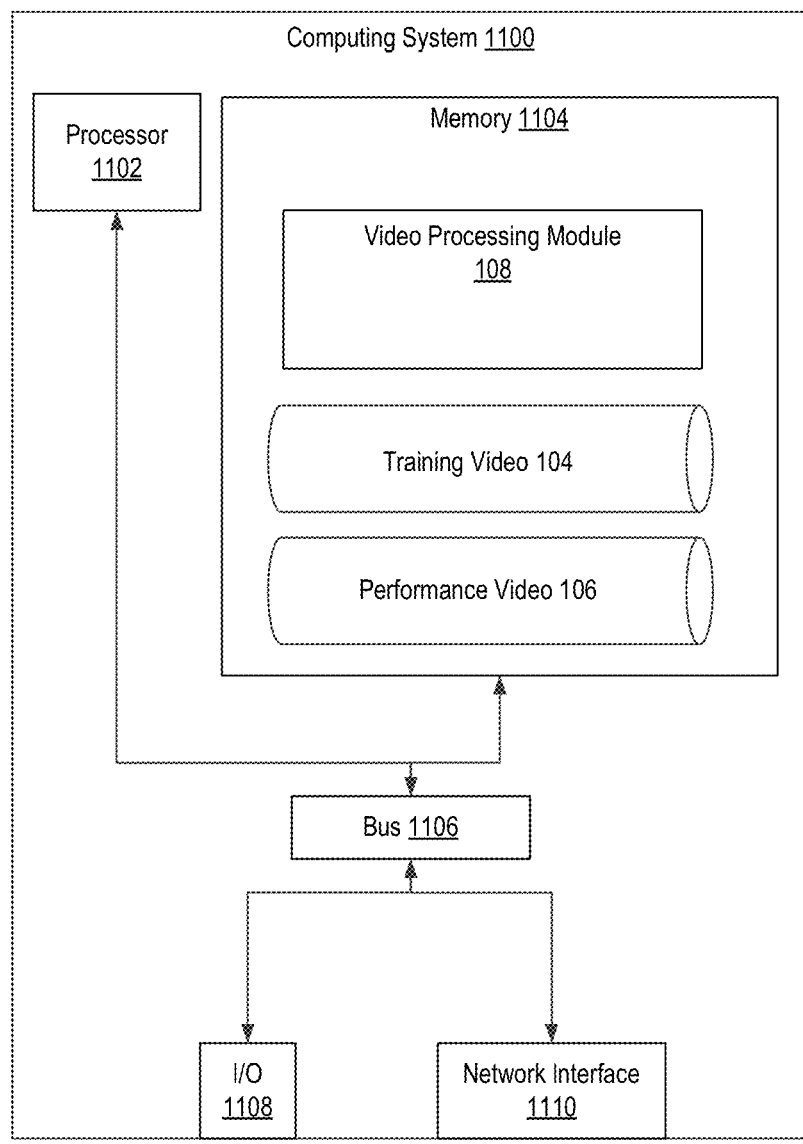
FIG. 11 depicts an example of a computing system that performs certain operations described herein, according to certain embodiments of the present technology.

In some embodiments, any suitable computing system or group of computing systems is used for performing the operations described herein. For example, FIG. 11 depicts examples of computing system 1100 that executes a training module 106. In some embodiments, the computing system 1100 also executes the relationship management tool 110, as depicted in FIG. 11. In other embodiments, a separate computing system having devices similar to those depicted in FIG. 11 (e.g., a processor, a memory, etc.) executes the relationship management tool 110.

The depicted examples of a computing system 1100 includes a processor 1102 communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. In embodiments, the processor 1102 includes any number of processing devices, including a single processing device.

The memory device 1104 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript.

In some embodiments, the computing system 1100 also includes a number of external or internal devices, such as input or output devices. For example, the computing system 1100 is shown with one or more input/output ("I/O") interfaces 1108. An I/O interface 1108 receives input from input devices or provide output to output devices. One or more buses 1106 are also included in the computing system 1100. The bus 1106 communicatively couples one or more components of a respective one of the computing system 1100.

The computing system 1100 executes program code that configures the processor 1102 to perform one or more of the operations described herein. The program code includes, for example, the video processing module 108 (which processes the pose selection system and/or the animation generation system) or other suitable applications that perform one or more operations described herein. The program code may be resident in the memory device 1104 or any suitable computer-readable medium and may be executed by the processor 1102 or any other suitable processor. In some embodiments, the video processing module 108, is stored in the memory device 1104, as depicted in FIG. 11. In additional or alternative embodiments, the video processing module 108 is stored in different memory devices of different computing systems. In additional or alternative embodiments, the program code described above is stored in one or more other memory devices accessible via a data network.

The computing system 1100 accesses one or more of the training video 104 and performance video 106 in any suitable manner. In some embodiments, some or all of one or more of these data sets, models, and functions are stored in the memory device 1104, as in the example depicted in FIG. 11. For example, a computing system 1100 that executes the video processing module 108 provides access to the training video 104 and performance video 106 by external systems that execute the relationship management tool 110.

In additional or alternative embodiments, one or more of these data sets, models, and functions are stored in the same memory device (e.g., one of the memory device 1104). For example, a common computing system hosts the video processing module 108. In additional or alternative embodiments, one or more of the programs, data sets, models, and functions described herein are stored in one or more other memory devices accessible via a data network.

The computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and the like. The computing system 1100 is able to communicate with one or more other computing devices via a data network using the network interface device 1110.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device includes any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for extracting and processing poses of a subject, the method comprising:
   extracting, by a processing device, sets of joint positions from a training video including the subject, wherein each set of joint positions is associated with a different frame of a plurality of frames from the training video;
   identifying, using the sets of joint positions, a hand type of the subject for one or more frames of the plurality of frames, wherein identifying a hand type for a frame further includes:
      determining a number of hands that are visible in the frame; and
      determining that the frame is a both left hand and right hand frame based on two hands in the frame being visible;
   grouping, by the processing device, the plurality of frames into frame groups using the hand type of the subject for the one or more frames, wherein a frame group includes a set of consecutive frames of the plurality of frames, and wherein the frame group represents a pose of the subject;
   identifying, by the processing device, a representative frame for each frame group using the frame groups;
   clustering, by the processing device, the frame groups into clusters using the representative frames, wherein each cluster includes frame groups that include different representations of the pose of the subject;
   outputting a visualization of the clusters at a user interface; and
   receiving a selection of a cluster for animation of the subject.

2. The method of claim 1, further comprising:
   identifying, by the processing device, a characteristic of the subject for each frame using the sets of joint positions; and
   grouping the plurality of frames into frame groups using the characteristic of the subject for each frame.

3. The method of claim 2, further comprising:
   outputting the visualization of the clusters at the user interface using the characteristic of the subject for each frame.

4. The method of claim 2, wherein identifying the characteristic for a frame includes identifying a hand type for the frame, and identifying the frame as a left hand frame, a right hand frame, or a both left hand and right hand frame.

5. The method of claim 1, wherein identifying a hand type for a frame further includes:
   determining a confidence level for each hand that is visible in the frame; and
   determining that the frame is a both left hand and right hand frame based on two hands in the frame being visible and the confidence level for each of the two hands exceeding a threshold.

6. The method of claim 5, wherein determining a number of hands that are visible in the frame includes determining, for each hand in the frame, the number of hands for which a percentage of hand joints that are visible in the frame exceeds a threshold percentage.

7. The method of claim 5, wherein the confidence level for a hand includes a confidence that fingertip joints on at least three fingers of the hand are detected.

8. The method of claim 1, further comprising:
determining a feature vector for each frame, wherein a feature vector for a frame includes:
 a) coordinate values of a wrist joint relative to a neck joint, and
 b) distance values of each fingertip in the frame relative to the wrist joint; and
identifying a hand type of the subject for each frame using the feature vector for each frame.

9. The method of claim 1, further comprising:
computing an inter-shoulder pixel distance of the subject for each frame;
estimating a scale of the subject in each frame using the inter-shoulder pixel distance;
normalizing feature vectors for each frame using the scale of the subject in each frame; and
grouping the plurality of frames into frame groups using the normalized feature vectors.

10. The method of claim 1, further comprising:
filtering the plurality of frames to remove frames that include:
 a) no subjects, or
 b) more than two subjects; and
grouping the plurality of frames into frame groups using the filtered plurality of frames.

11. The method of claim 10, further comprising, for a frame that includes two subjects:
determining a bounding box centroid for each of the two subjects;
determining which of the bounding box centroids of the two subjects is closest to a center of the frame;
assigning the subject with the closest bounding box centroid to the center of the frame as a primary subject.

12. The method of claim 1, further comprising:
identifying a size of each cluster, wherein the size of a cluster includes a number of frame groups included in the cluster;
sorting the clusters based on the size of each cluster; and
outputting, based on the sorting of the clusters, the clusters at the user interface.

13. The method of claim 1, further comprising:
generating a visualization of joint positions for each representative pose and a visualization of a looping sequence for each representative pose, wherein a representative looping sequence for a representative pose includes video frames associated with the representative pose;
wherein outputting the clusters at the user interface includes outputting the visualization of joint positions for each representative pose and the visualization of a looping sequence for each representative pose.

14. The method of claim 1, further comprising:
obtaining, from a non-transitory computer-readable medium, the training video of the subject, wherein the training video includes a plurality of frames with poses performed by the subject.

15. A system comprising:
one or more data processors; and
a non-transitory computer-readable medium storing instructions that, when executed by one or more processing devices, cause the one or more processing devices to perform operations comprising:
extracting, by a processing device, sets of joint positions from a training video including a subject, wherein each set of joint positions is associated with a different frame of a plurality of frames from the training video;
identifying, using the sets of joint positions, a hand type of the subject for one or more frames of the plurality of frames, wherein identifying a hand type for a frame further includes:
 determining a number of hands that are visible in the frame; and
 determining that the frame is a both left hand and right hand frame based on two hands in the frame being visible;
grouping, by the processing device, the plurality of frames into frame groups using the hand type of the subject for the one or more frames, wherein a frame group includes a set of consecutive frames of the plurality of frames, and wherein the frame group represents a pose of the subject;
identifying, by the processing device, a representative frame for each frame group using the frame groups;
clustering, by the processing device, the frame groups into clusters using the representative frames, wherein each cluster includes frame groups that include different representations of the pose of the subject;
outputting a visualization of the clusters at a user interface; and
receiving a selection of a cluster for animation of the subject.

16. The system of claim 15, wherein the instructions further comprise operations including:
identifying, by the processing device, a characteristic of the subject for each frame using the sets of joint positions; and
grouping the plurality of frames into frame groups using the characteristic of the subject for each frame.

17. The system of claim 16, wherein identifying the characteristic for a frame includes identifying a hand type for the frame, and identifying the frame as a left hand frame, a right hand frame, or a both left hand and right hand frame.

18. The system of claim 15, wherein the instructions further comprise operations including:
determining a feature vector for each frame, wherein a feature vector for a frame includes:
 a) coordinate values of a wrist joint relative to a neck joint, and
 b) distance values of each fingertip in the frame relative to the wrist joint; and
identifying a hand type of the subject for each frame using the feature vector for each frame.

19. The system of claim 15, wherein the instructions further comprise operations including:
computing an inter-shoulder pixel distance of the subject for each frame;
estimating a scale of the subject in each frame using the inter-shoulder pixel distance;
normalizing feature vectors for each frame using the scale of the subject in each frame; and
grouping the plurality of frames into frame groups using the normalized feature vectors.

20. A non-transitory computer-readable medium storing instructions that, when executed by one or more processing devices, cause the one or more processing devices to perform operations comprising:
extracting, by a processing device, sets of joint positions from a training video including a subject, wherein each set of joint positions is associated with a different frame of a plurality of frames from the training video;

identifying, using the sets of joint positions, a hand type of the subject for one or more frames of the plurality of frames, wherein identifying a hand type for a frame further includes:
  determining a number of hands that are visible in the frame; and
  determining that the frame is a both left hand and right hand frame based on two hands in the frame being visible;
grouping, by the processing device, the plurality of frames into frame groups using the hand type of the subject for the one or more frames, wherein a frame group includes a set of consecutive frames of the plurality of frames, and wherein the frame group represents a pose of the subject;
identifying, by the processing device, a representative frame for each frame group using the frame groups;
clustering, by the processing device, the frame groups into clusters using the representative frames, wherein each cluster includes frame groups that include different representations of the pose of the subject;
outputting a visualization of the clusters at a user interface; and
receiving a selection of a cluster for animation of the subject.

\* \* \* \* \*